(12) United States Patent
Kim et al.

(10) Patent No.: US 9,733,760 B2
(45) Date of Patent: Aug. 15, 2017

(54) IN-CELL TOUCH TYPE DISPLAY DEVICE, TOUCH CIRCUIT, DISPLAY DRIVER, AND IN-CELL TOUCH TYPE DISPLAY DEVICE DRIVING METHOD

(71) Applicant: LG Display Co., Ltd., Seoul (KR)

(72) Inventors: CheolSe Kim, Daegu (KR); BuYeol Lee, Goyang-si (KR); YongChan Park, Seoul (KR); Suyun Ju, Gangwon-do (KR)

(73) Assignee: LG Display Co., Ltd., Seoul (KR)

( * ) Notice: Subject to any disclaimer, the term of this patent is extended or adjusted under 35 U.S.C. 154(b) by 18 days.

(21) Appl. No.: 14/984,969

(22) Filed: Dec. 30, 2015

(65) Prior Publication Data

US 2017/0068376 A1    Mar. 9, 2017

(30) Foreign Application Priority Data

Sep. 8, 2015 (KR) .................. 10-2015-0127298

(51) Int. Cl.
*G06F 3/041* (2006.01)
*G06F 3/044* (2006.01)
*G02F 1/1333* (2006.01)

(52) U.S. Cl.
CPC ........ *G06F 3/0416* (2013.01); *G02F 1/13338* (2013.01); *G06F 3/041* (2013.01); *G06F 3/044* (2013.01); *G06F 3/0412* (2013.01); *G06F 3/0414* (2013.01); *G06F 2203/04105* (2013.01)

(58) Field of Classification Search
CPC ........ G06F 3/041; G06F 3/0416; G06F 3/044; G06F 3/0414; G06F 3/0412; G06F 2203/04105; G02F 1/13338

USPC .......................................................... 345/173
See application file for complete search history.

(56) References Cited

U.S. PATENT DOCUMENTS

| | | | |
|---|---|---|---|
| 2007/0085837 A1* | 4/2007 | Ricks .................. | G02F 1/13338 345/173 |
| 2011/0193794 A1 | 8/2011 | Hu et al. | |
| 2013/0234734 A1 | 9/2013 | Iida et al. | |
| 2013/0257784 A1 | 10/2013 | Vandermeijden et al. | |
| 2013/0278538 A1 | 10/2013 | Brunet et al. | |
| 2014/0085247 A1 | 3/2014 | Leung et al. | |
| 2014/0146000 A1 | 5/2014 | Jo et al. | |
| 2014/0267167 A1* | 9/2014 | Ricks ...................... | G06F 3/041 345/175 |
| 2014/0347315 A1* | 11/2014 | Mo ........................ | G06F 3/044 345/174 |

(Continued)

FOREIGN PATENT DOCUMENTS

WO    WO 2015/047374 A1    4/2015

OTHER PUBLICATIONS

European Search Report, European Application No. 15203136.5, Jan. 18, 2017, pages.

(Continued)

*Primary Examiner* — Jonathan Boyd
(74) *Attorney, Agent, or Firm* — Fenwick & West LLP

(57) ABSTRACT

The present disclosure provides an in-cell touch type display device, a touch circuit, a display driver, and an in-cell touch type display device driving method, which can not only sense the position of a touch generated by the user, but also sense the touch force, with which the user presses the screen during the touch, in order to provide various functions in various types.

23 Claims, 26 Drawing Sheets

(56) References Cited

U.S. PATENT DOCUMENTS

2015/0268802 A1* 9/2015 Kim ..................... G06F 3/0482
                                                        715/763
2015/0346866 A1  12/2015 Kusunoki et al.
2015/0355710 A1* 12/2015 Modarres ............... G09G 5/003
                                                        345/173
2016/0092015 A1   3/2016 Al-Dahle et al.
2016/0098120 A1   4/2016 Miyake
2016/0098131 A1   4/2016 Ogata et al.

OTHER PUBLICATIONS

Massie, S. et al., "Capacitive Touch Sensing ICs and the Appliance Industry White Paper," B6TS Touch Senseing IC, OMRON Electronic Components LLC, Aug. 31, 2006, 14 pages, May Be Retrieved at<URL:http://www.mouser.com/catalog/specsheets/omron_b6ts_whitepaper.pdf>.

* cited by examiner

IN-CELL TOUCH TYPE DISPLAY DEVICE, TOUCH CIRCUIT, DISPLAY DRIVER, AND IN-CELL TOUCH TYPE DISPLAY DEVICE DRIVING METHOD

CROSS-REFERENCE TO RELATED APPLICATION

This application claims priority from and the benefit under 35 U.S.C. §119(a) of Republic of Korea Patent Application No. 10-2015-0127298, filed on Sep. 8, 2015, which is hereby incorporated by reference for all purposes as if fully set forth herein.

BACKGROUND OF THE INVENTION

1. Field of the Invention

The present embodiments relate to an in-cell touch type display device, a touch circuit, a display driver, and an in-cell touch type display device driving method.

2. Description of the Prior Art

Development of information-oriented societies has been increasing various kinds of demands for display devices, and various types of display devices have been used, such as a liquid crystal display device, a plasma display device, and an organic light-emitting display device.

Among the display devices, furthermore, mobile devices, such as smart phones and tablets, and medium/large-sized devices, such as smart televisions, provide touch-type input processing according to user convenience, device characteristics, and the like.

Display devices capable of such touch input processing are evolving to provide more diversified functions, and user demands are also becoming more diversified.

However, the types of touch type display devices currently available in the market senses only the user's touch position (touch coordinate) by processing relevant input from the sensed touch position. Further, the touch type display devices has limitations in providing many functions of various kinds and satisfaction of various user demands.

SUMMARY

Embodiments relate to an in-cell touch type display device comprising a plurality of first electrodes, at least one second electrode, and a touch circuit. The plurality of first electrodes are embedded in a display panel. At least one second electrode is placed outside the display panel and capacitively coupled to each of the first electrodes. The touch circuit is coupled to the first electrodes and the at least one second electrode. The touch circuit applies a first voltage signal to each of the first electrodes, applies a second voltage signal to the at least one second electrode, and detects touch force on the display panel by processing a sensing signal representing a voltage level at each of the first electrode, responsive to applying the first voltage signal and the second voltage signal.

In one embodiment, the first signal and the second signal are applied during a touch driving period within a frame period.

In one embodiment, the first and second signals have an identical phase but different voltage levels.

In one embodiment, the first and second signals have a phase difference of 180 degrees and have different voltage levels.

In one embodiment, the touch circuit further determines a coordinate of a touch by processing sensing signals from the first electrodes.

In one embodiment, the sensing signal is of a first voltage level responsive to the display panel receiving a touch of a first touch force and the sensing signal is of a second voltage level responsive to the display panel receiving a touch of a second touch force weaker than the first touch force, the first voltage level higher than the second voltage level.

In one embodiment, the touch circuit determines the touch as a first type of touch responsive to a voltage level of the sensing signal not exceeding a reference voltage and determine the touch as a second type of touch responsive to the voltage level of the sensing signal exceeding the reference voltage.

In one embodiment, each of the first electrodes and the at least one second electrode are separated by a distance that changes according to magnitude of touch force on the display panel, the change in the distance causing change in the sensing signal.

In one embodiment, air or dielectric material is between the first electrodes and the at least one second electrode.

In one embodiment, the in-cell touch type display device further includes a structure configured to mount the display panel. The at least one second electrode is placed beneath or inside the structure.

In one embodiment, the in-cell touch type display device further includes a gap structure unit setting a distance between the first electrodes and the at least one second electrode when the touch force is not applied to the display panel. The distance changing responsive the touch force applied to the display panel.

In one embodiment, the gap structure unit includes a base plate on which the at least one second electrode is mounted; and a spacer elastic pattern between edges of an upper surface of the at least one second electrode and edges of a rear surface of a lower structure.

In one embodiment, the gap structure unit includes a base plate on which the at least one second electrode is mounted; and an elastic sheet between an upper surface of the at least one second electrode and a rear surface of a lower structure.

In one embodiment, the gap structure unit includes an upper film on a rear surface of a lower structure; a lower film facing the upper film; and a bonding agent bonding edges of a rear surface of the upper film to an upper surface of the lower film.

In one embodiment, the gap structure unit includes an elastic film between an upper surface of the at least one second electrode and a rear surface of a lower structure.

In one embodiment, the gap structure unit includes an inner pattern embedded in a lower structure.

In one embodiment, the lower structure is a back light unit of the display panel.

In one embodiment, the first electrodes are applied with a common voltage during a display driving period of the frame period.

In one embodiment, the touch circuit is included inside a data driver for generating signals for operating pixels in the display panel.

In one embodiment, the touch circuit comprises a first switch and a second switch. The first switch is turned on or off to selectively connect each of the first electrodes to a first reference voltage. The second switch is turned on or off to selectively connect each of the first electrode to a second reference voltage lower than the first reference voltage. The first signal changes between the first reference voltage and the second reference voltage.

In one embodiment, the touch circuit further includes a third switch and a fourth switch. The third switch is turned on or off to selectively connect the at least one second electrode to a third reference voltage. The fourth switch is turned on or off to selectively connect the at least one second electrode to a fourth reference voltage lower than the third reference voltage. The second signal changing between the third reference voltage and the fourth reference voltage.

In one embodiment, the touch circuit includes a signal path, a resistor, a capacitor, an operational amplifier, an analog-to-digital converter and a processor. The signal path is connected to each of the first electrodes. The resistor is connected to the signal path. The capacitor has a first node connected to the resistor. The operational amplifier has an inverted input connected to the resistor and an output connected to a second node of the capacitor. The analog-to-digital converter receives an output signal from the output of the operational amplifier and convert the output signal to a digital signal. The processor processes the digital signal to detect the touch force.

DETAILED DESCRIPTION OF THE EXEMPLARY EMBODIMENTS

Figure 1:
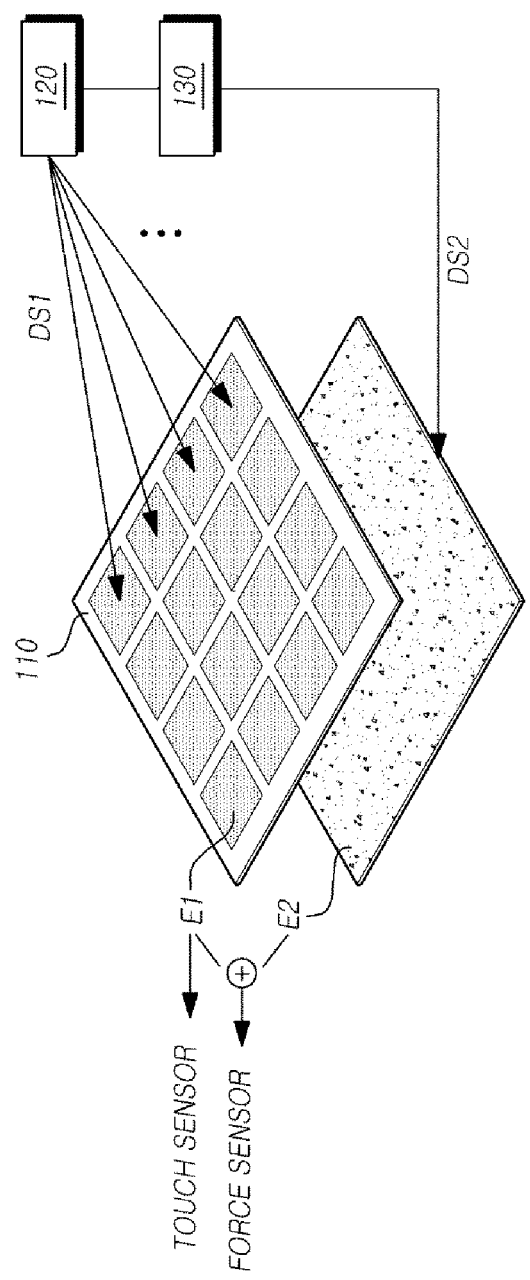
FIG. 1 is a conceptual diagram illustrating a schematic configuration of a touch system of an in-cell touch type display device according to one embodiment.

Hereinafter, embodiments of the present invention will be described in detail with reference to the exemplary drawings. In designating elements of the drawings by reference numerals, the same elements will be designated by the same reference numerals although they are shown in different drawings. Further, in the following description of the present invention, a detailed description of known functions and configurations incorporated herein will be omitted when it may make the subject matter of the present invention rather unclear.

In addition, terms, such as first, second, A, B, (a), (b) or the like may be used herein when describing components of the present invention. Each of these terminologies is not used to define an essence, order or sequence of a corresponding component but used merely to distinguish the corresponding component from other component(s). In the case that it is described that a certain structural element "is connected to", "is coupled to", or "is in contact with" another structural element, it should be interpreted that another structural element may be connected to", "be coupled to", or "be in contact with" the structural elements as well as that the certain structural element FIG. 1 is a diagram illustrating a schematic configuration of a touch system 100 of an in-cell touch type display device according to one embodiment. Referring to FIG. 1, the in-cell touch type display device includes a touch system 100 for sensing a touch by a pointer such as a finger or a pen. The touch system 100 not only senses whether a touch has occurred and the coordinate of the touch, but also force of the touch (hereinafter referred to as "touch force") applied by the pointer during the touch.

The touch system 100 may include multiple first electrodes E1 for detecting a coordinate of the touch, a second electrode E2 for sensing the touch force of the touch and a touch circuit 120. The touch circuit 120 sends driving signals to the multiple first electrodes E1 and the second electrode E2 and also senses occurrence of a touch, the coordinate of the touch and the magnitude of the touch force.

The multiple first electrodes E1, which correspond to touch sensors for determining whether a touch has occurred or not and to obtain the coordinate of the touch, may be arranged on a touch screen panel separate from the display panel 110 or be embedded and arranged in the display panel 110.

When the multiple first electrodes E1 are embedded and arranged in the display panel 110 as described above, the display panel 110 can be referred to as a "touch screen panel-integrated display panel" in which multiple first electrodes D1 are embedded. The in-cell touch type display device includes an "in-cell type touch screen panel."

On the other hand, the second electrode E2 for sensing the touch force may be positioned outside of the display panel 110 (for example, lower portion, upper portion, or side surface).

Driving signals for the multiple first electrodes E1 used for sensing a touch and detecting the coordinate of the touch, and driving signals for the second electrode E2 for sensing a touch force of the touch may be applied during the same process. Specifically, the touch circuit 120 of the touch system 100 may sequentially apply a first electrode driving signal DS1 to the multiple first electrodes E1 and also apply a second electrode driving signal DS2 to the second electrode E2, during a single touch driving period. That is, the multiple first electrodes E1 and the second electrode E2 are driven together during a single touch driving period.

The touch system 100, the multiple first electrodes E1 embedded in the display panel 110, and the second electrode E2 positioned outside the display panel 110, may be collectively referred to as a "force sensor." In addition, the multiple first electrodes E1 embedded in the display panel 110 may be referred to as "touch sensors" or "touch electrodes."

As described above, the touch system 100 performs first electrode driving and second electrode driving in the same touch driving process (touch driving period); and therefore, can perform sensing related to occurrence of a touch, the coordinate of the touch and touch force sensing within a shorter period of time compared with a case in which the first electrode driving and the second electrode driving are performed separately in different touch driving periods.

On the other hand, the touch system 100 according to the present embodiments may further include a second electrode driving signal generation unit 130 for generating a second electrode driving signal DS2, which corresponds to the first electrode driving signal DS1.

The second electrode driving signal generation unit 130 may be included outside the touch circuit 120 or may be included inside the touch circuit 120.

The second electrode driving signal generation unit 130 may be implemented in various types of circuit and, for example, may be implemented to include a level shifter or, in some cases, may include a phase converter.

The second electrode driving signal generation unit 130 can generate a second electrode driving signal DS2 by shifting the voltage level related to a first electrode driving signal DS1 generated by the touch circuit 120 or by a different device. The first second electrode driving signal DS2 may, for example, be generated by shifting the phase of the first electrode driving signal DS1.

A touch driving period, in which first electrode driving and second electrode driving are conducted together, may proceed together with a display driving period for image display, or may be time-divided with the display driving period and proceed between respective display driving periods.

Figure 2:
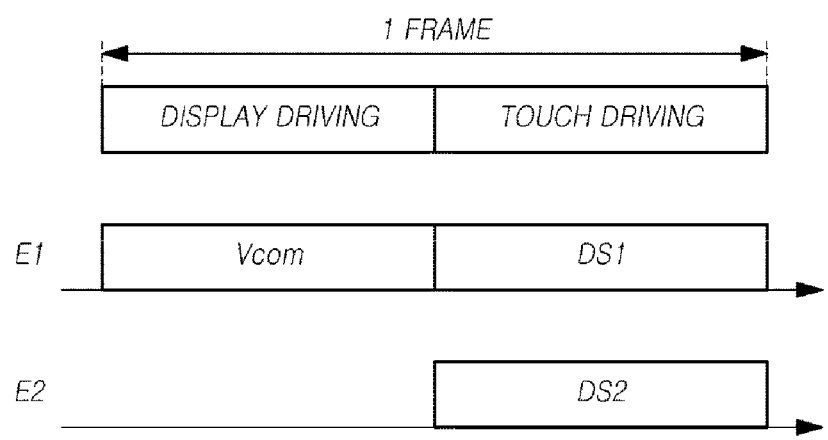
FIG. 2 is a timing diagram illustrating driving periods of an in-cell touch type display device according to one embodiments.

FIG. 2 illustrates time-divisional operation of display driving in a display driving period and and touch driving in a touch driving period, according to one embodiment. Referring to FIG. 2, the in-cell touch type display device according to embodiments may time-divide one frame period into a display driving period and a touch driving period. One frame period refers to a period for displaying a frame of image on the display panel. During the touch driving period, both first electrode driving and second electrode driving may be performed.

Therefore, during the touch driving period, a first electrode driving signal DS1 may be applied to the multiple first electrodes E1 and a second electrode driving signal DS2 may be applied to the second electrode E2.

On the other hand, the multiple first electrodes E1 embedded and arranged in the display panel 110 may be dedicated electrodes for touch sensing, or may be display driving electrodes also used for displaying images on the display panel 110. In one embodiment, the multiple first electrodes E1 may be common voltage electrodes embedded and arranged in the display panel 110 for receiving a common voltage Vcom during the display driving period. In such embodiment, a common voltage may be applied to all of the multiple first electrodes E1 as a display driving voltage during display driving, and a first electrode driving signal DS1 may be sequentially applied to each of the multiple first electrodes E1 during touch driving.

As described above, the multiple first electrodes E1 are mode sharing electrodes, which may also be used as display driving electrodes, making it unnecessary to separately form electrodes for two different uses (i.e., display and touch sense) on the display panel 110. This may make the panel design easy and the panel structure simple.

A structure for sensing a touch coordinate and a touch force by the touch system 100 according to embodiments and a touch driving method will hereinafter be described in more detail.

Figure 3:
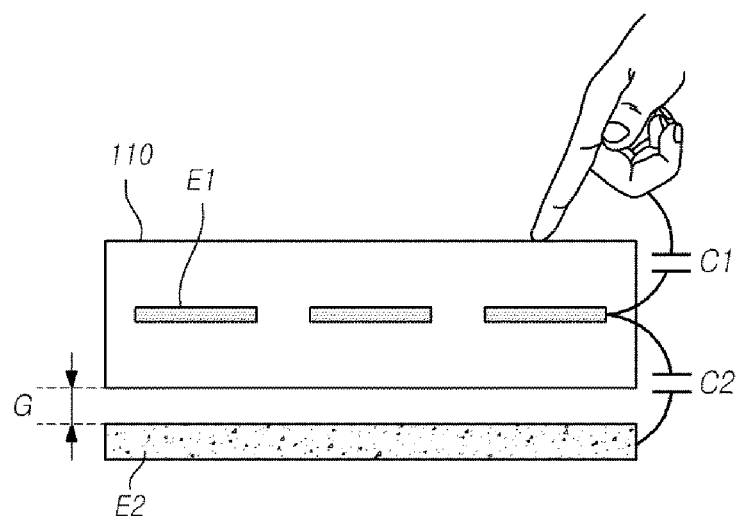
FIG. 3 is a diagram illustrating the structure of a touch system according to one embodiment.

FIG. 3 is a schematic diagram illustrating the structure of the touch system 100 according to one embodiment. Referring to FIG. 3, the touch system 100 does not use a dedicated pressure sensor for pressure sensing, as in the case of an existing pressure sensing touch sensors, but instead uses a second electrode E2 outside the display panel 110 in conjunction with multiple first electrodes E1 embedded in the display panel 110 for sensing touch force. The multiple first electrodes E1 are also used for sending touch coordinate.

That is, sensing of the touch force can be conducted by driving multiple first electrodes E1 and a second electrode E2 together.

Referring to FIG. 3, during a touch driving period, a first electrode driving signal DS1 is applied to a first electrode E1. If a second electrode driving signal DS2 is applied to the second electrode E2, a first capacitance C1 is formed between a pointer (e.g., a finger) and the first electrode E1 while a second capacitance C2 is formed between the first electrode E1 and the second electrode E2.

The touch circuit 120, for example, may calculate a touch coordinate and sense a touch force based on the change of the first capacitance C1 and the second capacitance C2.

Referring to FIG. 3, second capacitance C2 is formed between the first electrode E1 and the second electrode E2. The second capacitance C2 is a function of a gap G between the first electrode E1 and the second electrode E2. The gap G existing between the first electrode E1 and the second E2 may change according to the magnitude of touch force on the upper portion of the display panel 110.

The change in the gap G may vary depending on the position. That is, the change of gap G when the touch force is applied to the center point of the second electrode E2 may be larger than the change of gap G when touch force is applied at the edge points of the second electrode E2 and the multiple first electrodes E1. This is particularly true when the edge portions of the second electrode E2 are bonded or coupled to a peripheral structure.

When the change of the gap G occurs as a result of a touch force, the second capacitance C2 between the first electrode E1 and the second electrode E2 changes accordingly, and the touch force can be sensed base on the degree of change in the second capacitance C2.

In such embodiments, two kinds of sensing (i.e., touch position sensing and touch force sensing) can be performed efficiently by using the same structure.

The above-mentioned gap G existing between the multiple first electrodes E1 and the second electrode E2 may be an air gap or a gap with dielectric substance inbetween.

Figure 4:
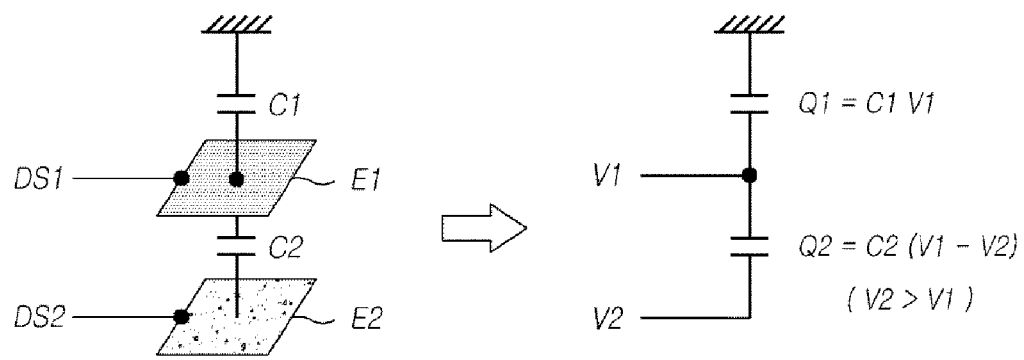
FIG. 4 is a diagram illustrating an equivalent circuit diagram of the in-cell touch type display when providing driving signal to electrodes, according to one embodiment.

FIG. 4 is a schematic illustration of the structure of the touch system 100, according to one embodiment. 3. Referring to FIG. 4, during a touch driving period, a first electrode driving signal DS1 is applied to a first electrode E1. If a second electrode driving signal DS2 is applied to the second electrode E2 while the the first electrode driving signal DS1 is applied, a first capacitance C1 is formed between a pointer (e.g., a finger) and the first electrode E1 while a second capacitance C2 is formed between the first electrode E1 and the second electrode E2.

Electrical charge Q1 in the capacitor between the pointer and the first electrode E1 during such touch driving is determined by the first capacitance C1 and the voltage V1 of the first electrode driving signal DS1.

In addition, electrical charge Q2 that charges a capacitor between the first electrode E1 and the second electrode E2 may be determined by the second capacitance C2, the voltage V1 of the first electrode driving signal DS1, and the voltage V2 of the second electrode driving signal DS2.

Particularly, the electrical charge Q1, which charges the capacitor between the pointer and the first electrode E1, and the amount of electrical charge Q2, which charges the capacitor between the first electrode E1 and the second electrode E2, during touch driving, may be expressed by equation (1) below:

$$Q1 = C1 \times V1; \quad Q2 = C2 \times (V1 - V2) \qquad \text{Equation (1)}$$

Characteristics of signals DS1 and DS2 used during the above-mentioned touch driving (first electrode driving and second electrode driving) are hereinafter be described.

Figure 5:
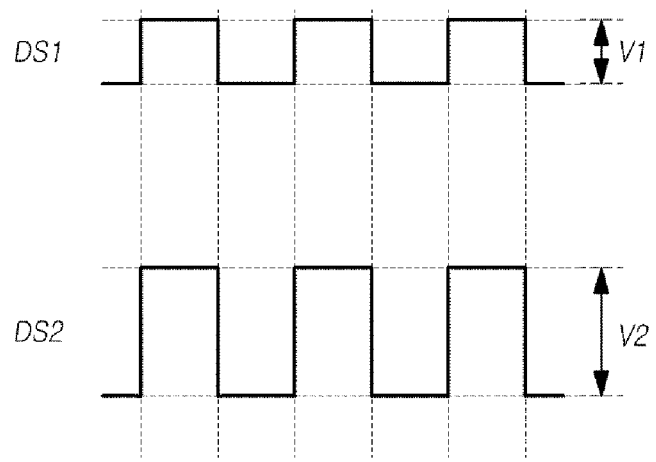
FIG. 5 is a timing diagram illustrating relationships between signals for driving first and second electrodes in a touch system according to one embodiment.
Figure 6:
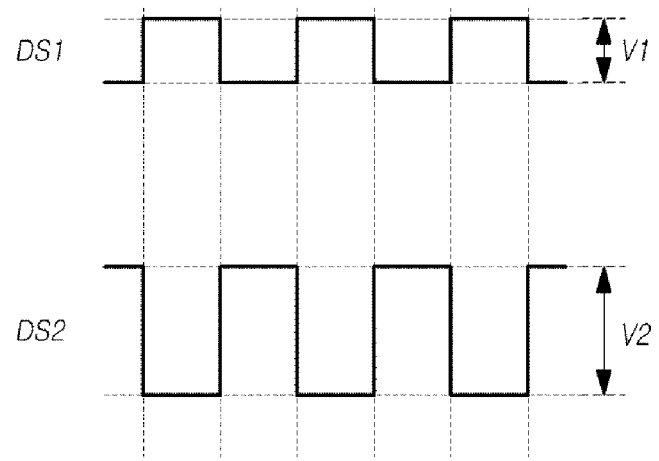
FIG. 6 is a timing diagram illustrating relationships between signals for driving first and second electrodes in a touch system according to another embodiment.

FIG. 5 is a timing diagram illustrating a first electrode driving signal DS1 for first electrode driving and a second electrode driving signal DS2 for second electrode driving in connection with a touch system 100 according to one embodiment. FIG. 6 is a diagram illustrating a first electrode driving signal DS1 for first electrode driving and a second electrode driving signal DS2 for second electrode driving in connection with a touch system 100 according to another embodiment.

As illustrated in FIG. 5, the second electrode driving signal DS2 and the first electrode driving signal DS1 may have the same phase. In this case, the second electrode driving signal DS2 and the first electrode driving signal DS1 have an equiphase (same phase) relationship.

By using a second electrode driving signal DS2 and a first electrode driving signal DS1 having the same phase, efficient touch driving (second electrode driving and first electrode driving) and efficient sensing (touch force sensing and touch coordinate sensing) can be performed. In addition, two kinds of signals for touch driving, i.e., the second electrode driving signal DS2 and the first electrode driving signal DS1, can be generated easily.

On the other hand, referring to FIG. 5, the second electrode driving signal DS2 may have a voltage level higher than the voltage of the first electrode driving signal DS1. That is, the voltage V2 of the second electrode driving signal DS2 may be higher than the voltage V1 of the first electrode driving signal DS1. When the voltage V2 of the second electrode driving signal DS2 is higher than the voltage V1 of the first electrode driving signal DS1, the electrical charge Q2 in the capacitor between the first electrode E1 and the second electrode E2 has a negative (−) value.

In this regard, the signal received from the first electrode E1 is a signal corresponding to the combined amount of electrical charges Q1+Q2. As the electrical charge Q2 has a negative (−) value, Q1+Q2 becomes smaller than Q1; and as a result, the voltage level of a sensing signal received from the first electrode E1 is reduced.

Therefore, if (i) the voltage V2 of the second electrode driving signal DS2 is higher than the voltage V1 of the first electrode driving signal DS1 and (ii) the second electrode driving signal DS2 and the first electrode driving signal DS1 have an equiphase relationship, the voltage level of the signal received from the first electrode E1 becomes negative (−) with reference to the baseline, which enables accurate distinction between a soft touch (i.e., when the pressing force does not exist or is equal to or below a predetermined level) and a force touch (i.e., when the pressing force exists or exceeds the predetermined level).

As illustrated in FIG. 6, the second electrode driving signal DS2 and the first electrode driving signal DS1 may have a phase difference of 180 degrees. In such embodiment, the second electrode driving signal DS2 and the first electrode driving signal DS1 have a reverse-phase relationship.

When a second electrode driving signal DS2 and a first electrode driving signal DS1 having a reverse-phase relationship as described with reference to FIG. 6 are used, the voltage difference (V1−V2) between the voltage V1 of the first electrode driving signal DS1 and the voltage V2 of the second electrode driving signal DS2 increases to a positive value (+). When an appropriate sensing scheme is implemented, use of the second electrode driving signal DS2 and the first electrode driving signal DS1, which have a reverse-phase relationship, may be efficient.

An example of an internal circuit configuration of a touch circuit 120, which is configured for the above-mentioned touch driving and sensing of a touch coordinate and a touch force therethrough, will hereinafter be described.

Figure 7:
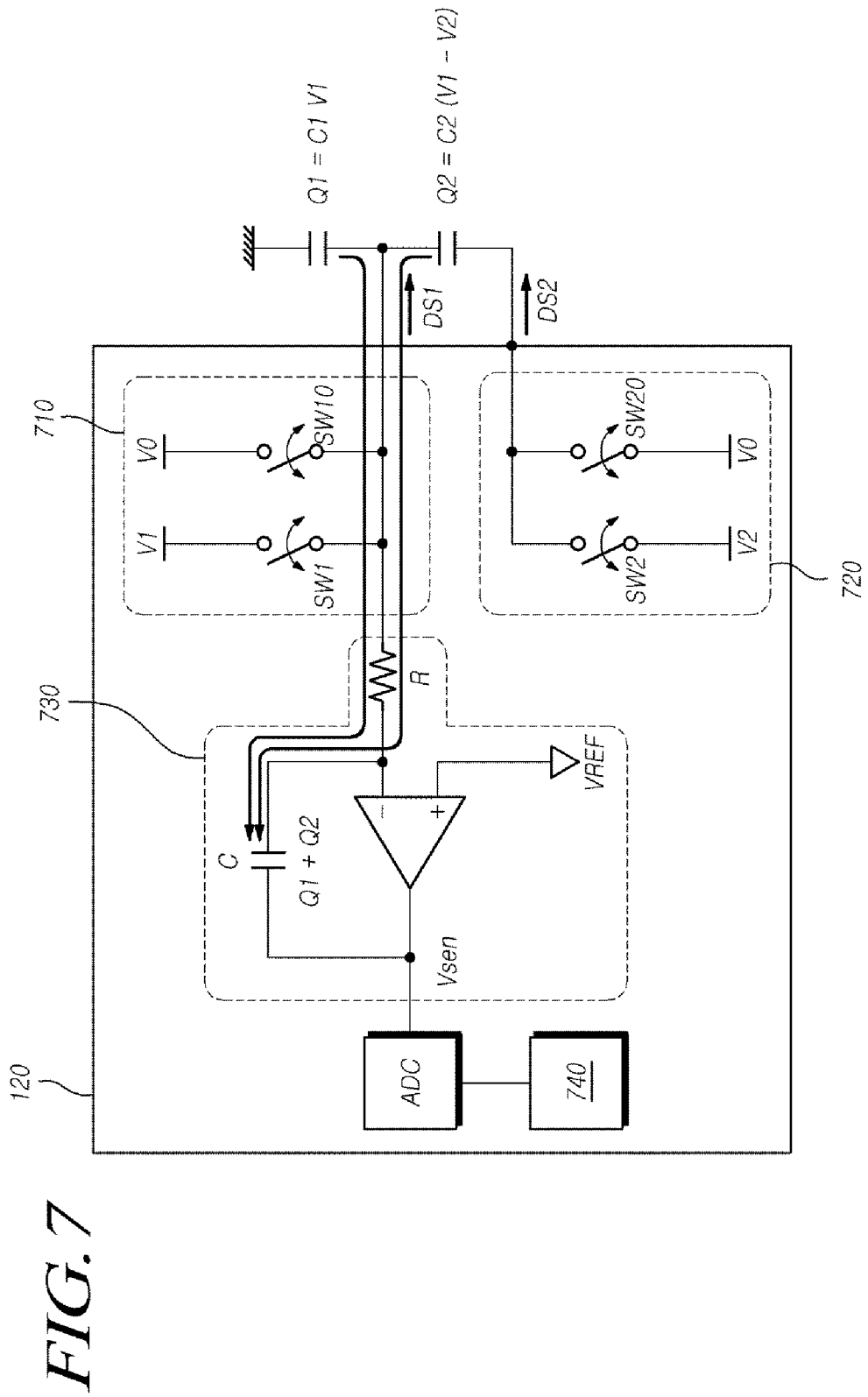
FIG. 7 is a circuit diagram illustrating an example of a touch circuit for providing voltage signals to the electrodes and sensing charges in the electrodes, according to one embodiment.

FIG. 7 is a circuit diagram illustrating an example of a touch circuit 120 according to one embodiment. As illustrated in FIG. 7, the touch circuit 120 may include a first electrode driving signal supply unit 710 configured to supply a first electrode driving signal DS1 as a modulated signal having a high voltage level V1 and a low voltage level V0, by turning on or off two switches SW1 and SW10. A second electrode driving signal supply unit 720 supplies a second electrode driving signal DS2 as a modulated signal having a high voltage level V2 and a low voltage level V0 by turning on or off two switches SW2 and SW20. The touch circuit also includes an integrator 730 with an operation amplifier OP-AMP, a capacitor C, a resistor R, an analog-digital converter ADC configured to convert the output value from the integrator 730 to a digital value, and a processor 740 configured to perform touch coordinate calculation, touch force recognition, and the like on the basis of the digital value output from the analog-digital converter ADC.

In other embodiments, at least one of the analog-digital converter ADC, and the processor 740 may be positioned outside the touch circuit 120.

The circuit configuration of the touch circuit 120 illustrated in FIG. 7 is only an example for convenience of description, and may be implemented in various other forms. For example, a multiplexer between the touch circuit 120 and a plurality of first electrodes E1 for sequentially process signals from the first electrodes E1 is omitted herein for the sake of brevity.

As illustrated in FIG. 7, the touch circuit 120 may sequentially apply a first electrode driving signal DS1 to multiple first electrodes E1, apply a second electrode driving signal DS2 to a second electrode E2, and sense the amount of charge (or voltage level) resulting from the change in size of the gap G between the multiple first electrodes E1 and the second electrode E2 during touch driving based on signals received from each of the first electrodes E1 to recognize the touch force.

When the pointer is made of a non-conductive material, the touch circuit 120 can sense only a touch force on the basis of signals received from the multiple first electrodes E1. However, when the pointer is made of a conductive material, the touch circuit 120 can additionally detect the coordinate of the touch based on the signals received from the multiple electrodes E1.

The signals received from one of the multiple first electrode E1 correspond to the combined electrical charges Q1+Q2. The combined electrical charges Q1+Q2 is used to charge the capacitor C inside the integrator 730 and is output from the integrator 730 as a sensing voltage value Vsen.

The analog-digital converter ADC converts the sensing voltage value Vsen to a digital value.

As the multiplexer (not shown) sequentially couples each of the first delectrodes E1 to the integration unit 120, Vsen value for each of the first electrodes E1 are obtained from the integration unit 730 and then converted into digital values. The processor 740 stores the digital version of Vsens values. Based on the distribution of the digital version of Vsens values, the processor 740 may calculate a touch coordinate and also determine the magnitude of the touch force. That is, the processor 740 performs touch coordinate calculation and force touch detection using the same signal. This enables two kinds of sensing (touch sensing and touch force sensing) to be performed quickly and efficiently.

When touch force has been detected, an application or a function corresponding to the touch force may be executed on an electronic device mounted with the touch screen. The touch circuit 120 may also sense the charge (or voltage), which follows the change in size of the gap G between the multiple first electrodes E1 and the second electrode E2, and determine the strength of the touch force according to the charge (or voltage level). According to the above description, it is possible to determine not only whether there was force applied during a touch force but also the strength of the touch force applied by the user.

In this regard, when the size of a touch force is determined, an application or a function, which has been predetermined so as to correspond to the grasped size of the touch force, may be differentiated and executed.

Characteristics of received signals generated differently depending on whether the touch was a soft touch or a force touch at a touch system 100 is hereinafter described.

Figure 8:
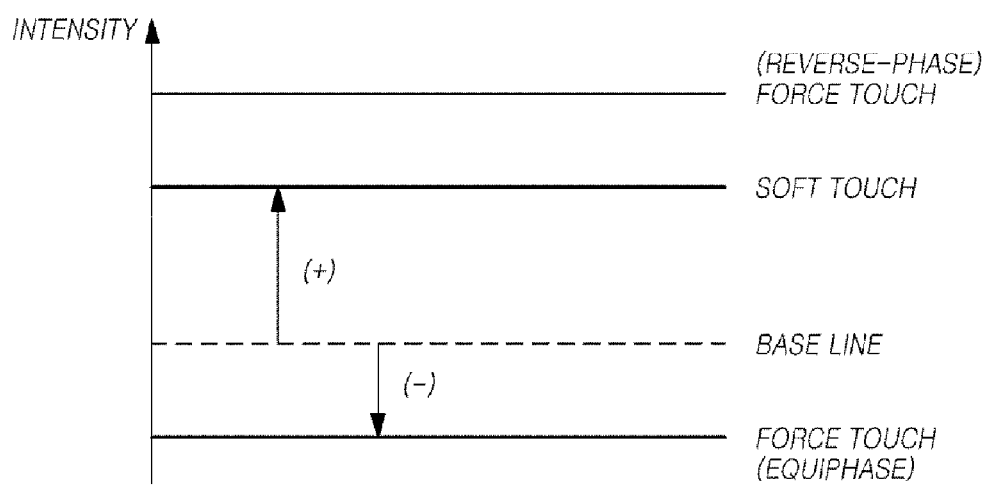
FIG. 8 is a diagram illustrating the amplitude of a received signal based on a force touch according to one embodiment.
Figure 9A:
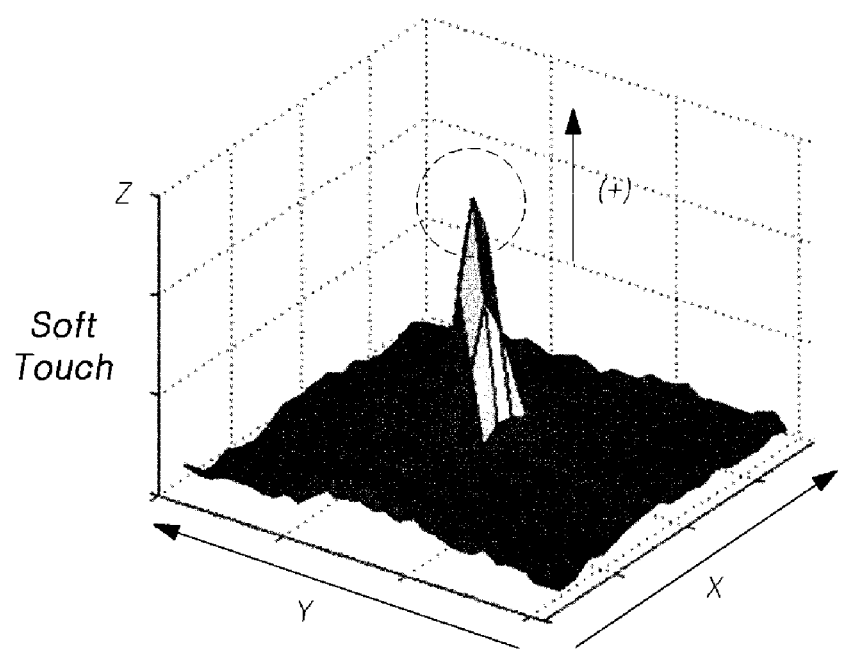
FIG. 9A is a graph illustrating the amplitude distribution of received signals based on a soft touch according to the present embodiments.
Figure 9B:
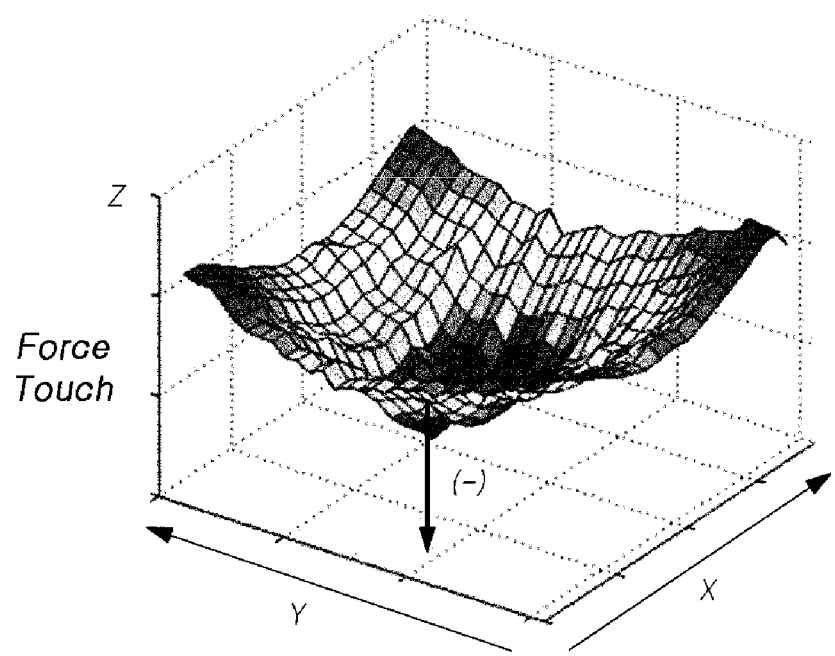
FIG. 9B is a graph illustrating the amplitude distribution of received signals based on a hard touch according to the present embodiments.

FIG. 8 is a diagram illustrating the amplitude of a received signal resulting from a soft touch, and the amplitude of a received signal, which results from a force touch, in connection with a touch system 100 according to one embodiment. FIGS. 9A and 9B are diagrams illustrating the amplitude distribution of a received signal resulting from a soft touch, and the amplitude of a received signal resulting from a force touch according to one embodiment.

Referring to FIG. 8, the signal amplitude of a signal received from the first electrode E1 can be confirmed from a digital value output from the analog-digital converter ADC.

Referring to FIG. 8 and FIG. 9A, when there is no pressing force or the pressing force is equal to or less than a predetermined level, a digital value output from the analog-digital converter ADC has a positive (+) value compared to a digital value output from the analog-digital converter ADC when there is no touch at all (baseline). In FIG. 9A, X axis and Y axis indicate coordinates of the first electrodes E1 while Z axis represent digital value output from the ADC at an electrode E1 of X, Y coordinate. As illustrated in FIG. 9A, the digital value output from the analog-digital converter ADC when a soft touch has occurred has a peak in an area corresponding to the position of the corresponding first electrode E1 where the soft touch has occurred.

Referring to FIG. 8, assuming that the second electrode driving signal DS2 and the first electrode driving signal DS1 have an equiphase relationship, when a pressing force exists or exceeds a predetermined level, a digital value output from the analog-digital converter ADC has a negative (−) value compared to a digital value output from the analog-digital converter ADC when there is no touch at all (baseline). As illustrated in FIG. 9B, the second electrode E2 has the shape of a bulk plate outside the display panel 110 so that, the size (signal amplitude) of a digital value output from the analog-digital converter ADC, when a force touch occurs, has a distribution having the overall signal amplitude increasing in the negative direction (−), with reference to the baseline.

The stronger the touch force becomes, the larger the change in size of the gap G between the multiple first electrodes E1 and the second electrode E2 becomes; therefore, the digital value output from the analog-digital converter ADC has decreases further in the negative direction (−), with reference to a digital value output from the digital-analog converter ADC when there is no touch at all (baseline). That is, the absolute amplitude of the digital version of Vsens increases in proportion to the amplitude of the force touch.

In summary, signals received from the multiple first electrodes E1, respectively, when the touch is a soft touch and signals received from the multiple first electrodes E1, respectively, when the touch is a force touch may be signals in opposite directions with reference to signals received from the multiple first electrodes E1, respectively, when there is no touch.

That is, signals received from the multiple first electrodes E1, respectively, when the touch is a soft touch have signal amplitudes larger than those of baseline signals produced when there is no touch; and signals received from the multiple first electrodes E1, respectively, when the touch is a force touch have signal amplitudes smaller than those of the baseline signals.

Assuming that the second electrode driving signal DS2 and the first electrode driving signal DS1 have an equiphase relationship, the amount of charging Q1+Q2 (Q2≠0) sensed when the touch is a force touch, or a voltage corresponding thereto, may be smaller than the amount of charging Q1+Q2=Q1 (Q2=0) sensed when the touch is a soft touch, or a voltage corresponding thereto. In this regard, Q1 and Q2 may be the amount of electrical charges for charging or the amount of change in the amount of electrical charges for charging.

In addition, assuming that the second electrode driving signal DS2 and the first electrode driving signal DS1 have an equiphase relationship, the electrical charge or voltage sensed when the touch is a force touch may be smaller than the base amount of charging or base voltage sensed when there is no touch.

As described above, with reference to signals received from the multiple first electrodes E1, respectively, when there is no touch, signals received from the multiple first electrodes E1, respectively, when the touch is a soft touch are signals in the positive (+) direction (or negative (−) direction); signals received from the multiple first electrodes E1, respectively, when the touch is a force touch are signals in the negative (−) direction (or positive (+) direction); the amount of charging Q1+Q2 sensed when the touch is a force touch, or a voltage corresponding thereto, is smaller than the amount of charging Q1 sensed when the touch is a soft touch, or a voltage corresponding thereto (Q1+Q2<Q1); therefore, an accurate distinction can be made between a soft touch, i.e. the pressing force does not exist or is equal to or less than a predetermined level, and a force touch, i.e. the pressing force exists or exceeds the predetermined level.

Referring to FIG. 8, assuming that the second electrode driving signal DS2 and the first electrode driving signal DS1 have a reverse-phase relationship, a digital value output from the analog-digital converter ADC when a pressing force exists or exceeds a predetermined level, i.e. when a force touch has occurred, has a value in the positive (+) direction, with reference to a digital value output from the analog-digital converter ADC when there is no touch at all (baseline), and has a value larger than a digital value output from the analog-digital converter ADC when the pressing force does not exist or is equal to or less than the predetermined level, i.e., when a soft touch has occurred.

Assuming that the second electrode driving signal DS2 and the first electrode driving signal DS1 have a reverse-phase relationship, the charge Q1+Q2 (Q2>0) sensed when the touch is a force touch, or a voltage corresponding thereto, may be larger than the amount of charging Q1+Q2=Q1 (Q2=0) sensed when the touch is a soft touch, or a voltage corresponding thereto.

Use of the above-mentioned relationship makes it possible to efficiently distinguish between a soft touch and a force touch, in the case of conducting touch driving (second electrode driving and first electrode driving) using a second electrode driving signal DS2 and a first electrode driving signal DS1, which have a reverse-phase relationship.

On the other hand, the touch system 100 has a structure that enables sensing of a touch force, and an example of the structure for touch force sensing will hereinafter be described.

Figure 10:
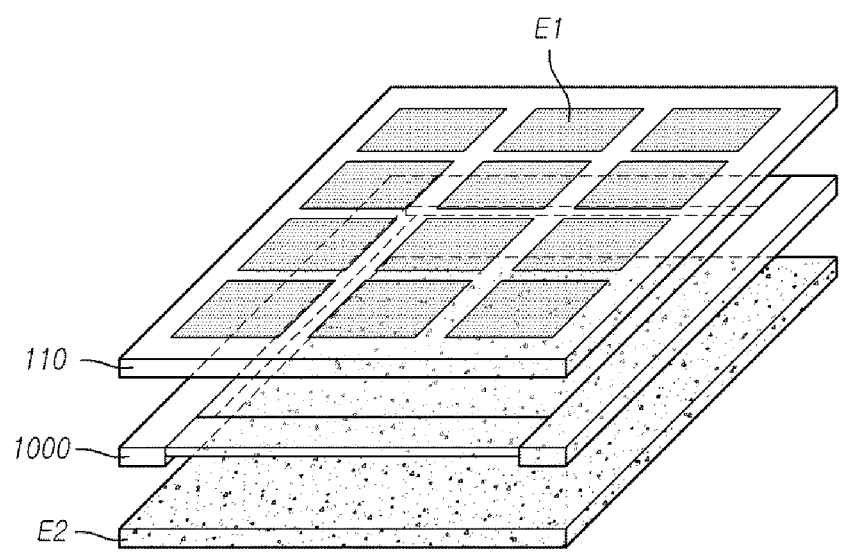
FIG. 10 is an schematic exploded view of a touch system according to one embodiment.

FIG. 10 is a diagram schematically illustrating a touch system 100 according to the present embodiments. Referring to FIG. 10, the touch system 100 includes multiple first electrodes E1 arranged on a display panel 110, a second electrode E2 positioned outside the display panel 110, and the like.

In order to sense a touch force, a gap G variable according to a force touch is provided between the multiple first electrodes E1 and the second electrode E2.

The touch system 100 may include a gap structure unit 1000, which makes a gap G between the multiple first electrodes E1 and the second electrode E2, and which enables a change in size of the gap G according to touch force. Such a gap structure unit 1000 can enable sensing of a touch force.

Figure 11:
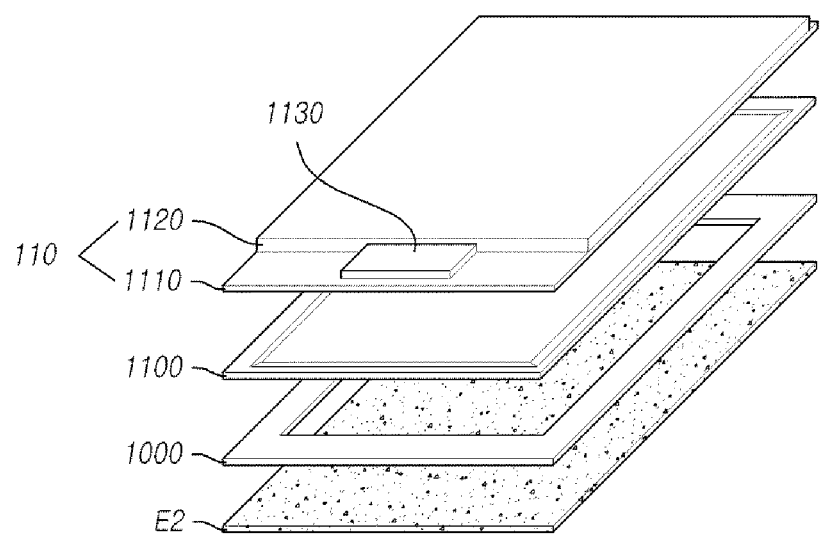
FIG. 11 is a schematic exploded view of an in-cell touch type display device according to one embodiment.

FIG. 11 is a diagram illustrating of an in-cell touch type display device according to one embodiment. Referring to FIG. 11, in connection with an in-cell touch type display device according to embodiments, the display panel 110 may include a first substrate 1110, on which a TFT (Thin Film Transistor) and the like are arranged, and a second substrate 1120, on which a CF (Color Filter) and the like are arranged. Furthermore, the first substrate 1110 may have a driving chip 1130 mounted, bonded, or connected to an edge portion (non-active area) thereof.

The driving chip 1130 may be a chip that implements a touch circuit 120 or a data driving chip, and in some cases, may also be a display driving chip including a touch circuit 120, a data driving circuit, and the like.

Referring to FIG. 11, a lower structure 1100 may be positioned beneath the display panel 110. A gap structure unit 1000 may be positioned beneath or inside the lower structure 1100. The second electrode E2 may be included beneath or inside the gap structure unit 1000. Accordingly, the second electrode E2 may be positioned beneath or inside the lower structure 1100 of the display panel 110.

Variously designing the position of the second electrode E2, the position of the gap structure unit 1000, or the like, as described above, can implement a touch system adapted to the design structure of the display panel 110 and the in-cell touch type display device.

It will be assumed, hereinafter, that the in-cell touch type display device according to the present embodiments is a liquid crystal display device, and various types of gap structure units 1000 that can be applied to the liquid crystal display device will be described. In this regard, the positions of first electrodes E1 and a second electrode E2, which are included in the liquid crystal display device, will now be described briefly.

Figure 12:
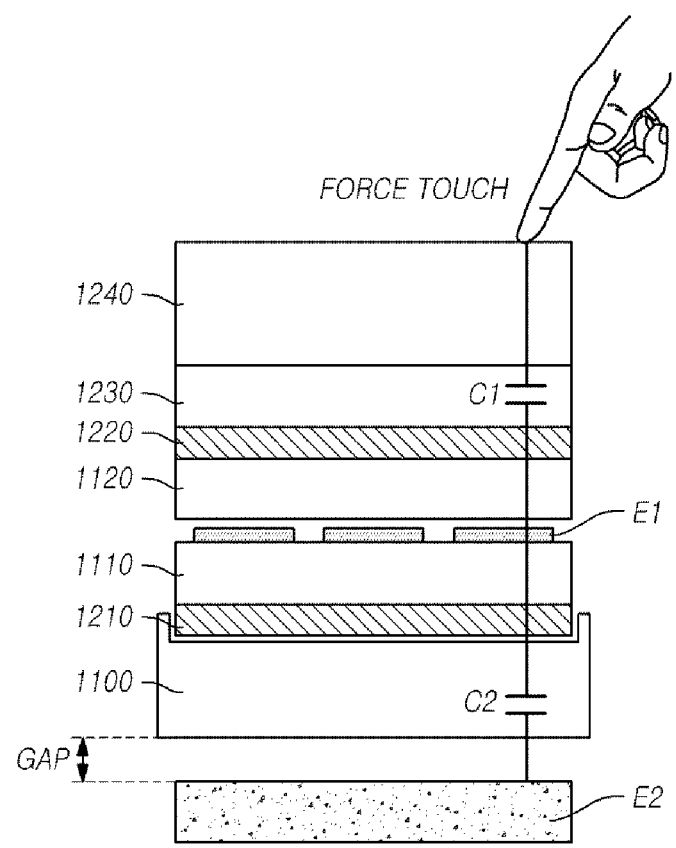
FIG. 12 is a cross-sectional diagram of an in-cell touch type display device according to another embodiment.

FIG. 12 is a diagram illustrating a different structure of an in-cell touch type display device 100 according to the present embodiments. The vertical positions of multiple first electrodes E1, a second electrode E2, and a lower structure 1100 are illustrated in FIG. 12. The display panel 110 includes a first polarization plate 1210, a first substrate 1110, multiple first electrodes E1, a second substrate 1120, a second polarization plate 12220, and the like. A bonding layer 1230 and an upper cover 1240 are positioned on the display panel 110. A lower structure 1100 is positioned beneath the display panel 110.

The lower structure 1100 may be a structure already existing in the in-cell touch type display device, or a structure separately provided for the second electrode E2. The lower structure 1100, for example, may be a back light unit, a back cover, or the like of the liquid crystal display device. Besides, any structure is acceptable as long as it does not interfere with the electric field generated from the first electrodes E1 such that a capacitor can be formed between the first electrodes E1 and the second electrode E2.

Positioning the second electrode E2 beneath or inside the lower structure 1100, which corresponds to a back light unit, as described above, enable implementation of a touch system 100 for an liquid crystal display device.

On the other hand, in the case of a liquid crystal display device, a layer of material such as silver (Ag), a reflection plate, a transparent electrode layer, and the like is absent to form a second capacitance C2 between the first electrodes E1 and the second electrode E2.

Various examples of gap structure units 1000 will hereinafter be described. FIG. 13 to FIG. 17 are diagrams illustrating examples of a gap structure unit 1000 of a touch system 100 according to the present embodiments.

Figure 13:
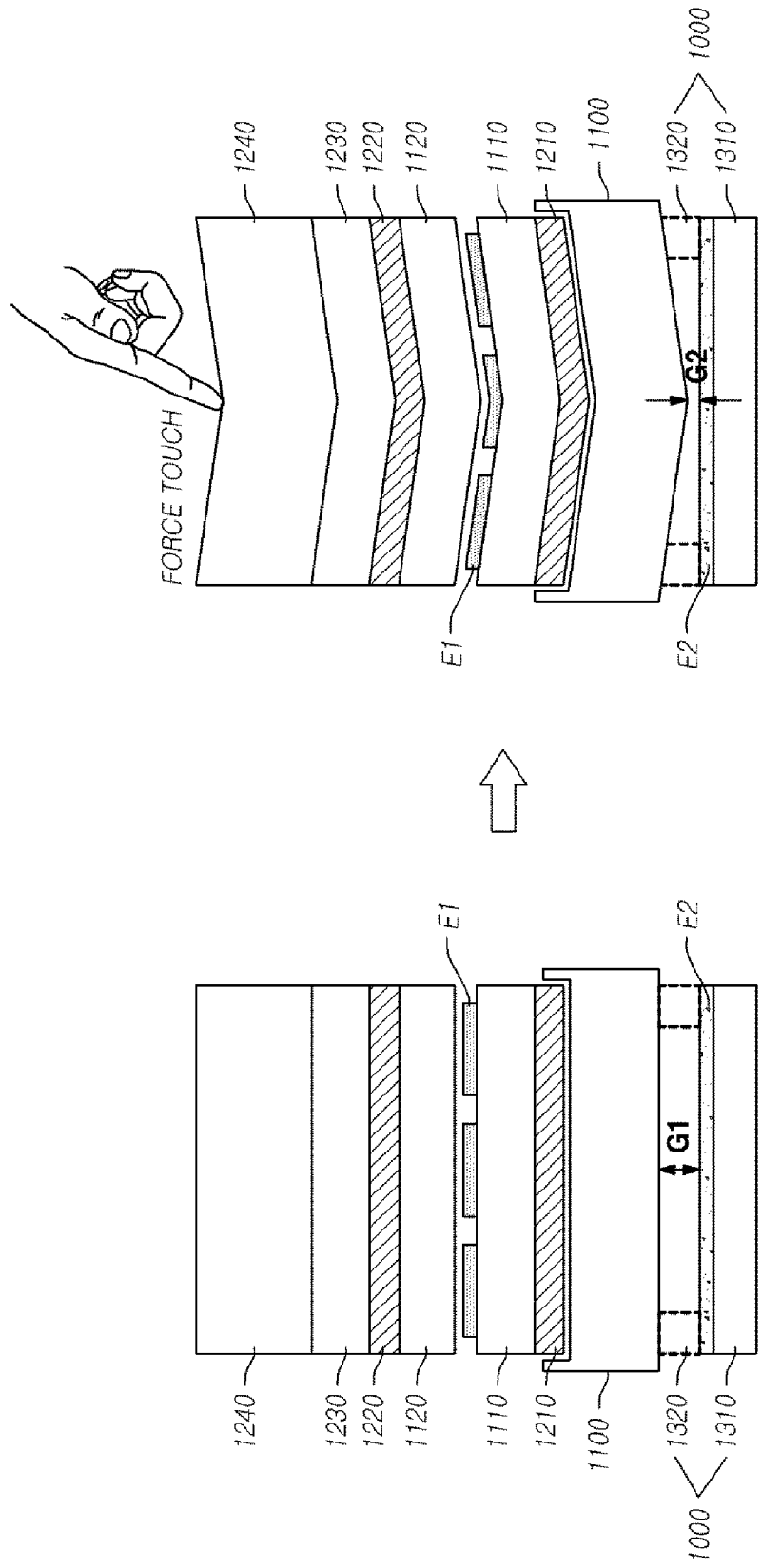
FIG. 13 through FIG. 17 are cross-sectional diagrams illustrating gap structure units of touch systems according to embodiments.

Referring to FIG. 13, the gap structure unit 1000 may include a base plate 1310 made of a substrate or a film, a spacer elastic pattern 1320 positioned between the upper surface edge of a second electrode E2, which is positioned on the base plate 1310, and the rear surface edge of a lower structure 1100, and the like.

The spacer elastic pattern 1320 may be attached, bonded, or coated on the rear surface of the lower structure 1100. The spacer elastic pattern 1320 is made of an elastic material.

Referring to FIG. 13, when a force touch occurs, the upper cover 1240, the display panel 110, the lower structure 1100, and the like receive a downward force. Accordingly, the touch force may change the size of the gap G between the non-edge portion of the upper surface of the second electrode E2 and the non-edge portion of the rear surface of the lower structure 1100.

Particularly, the gap G before occurrence of the force touch is G1, and the gap G after occurrence of the touch force is G2, which is smaller than G1.

Such a decrease of the gap G from G1 to G2, before and after occurrence of a force touch, changes the second capacitance C2 and enables recognition of the force touch.

The gap structure unit 1000 of FIG. 13 can increase the gap change and does not require modification of existing structures, such as the display panel 110 and the lower structure 1100, making it possible to easily implement a touch system 100 capable of efficient force touch sensing.

Figure 14:
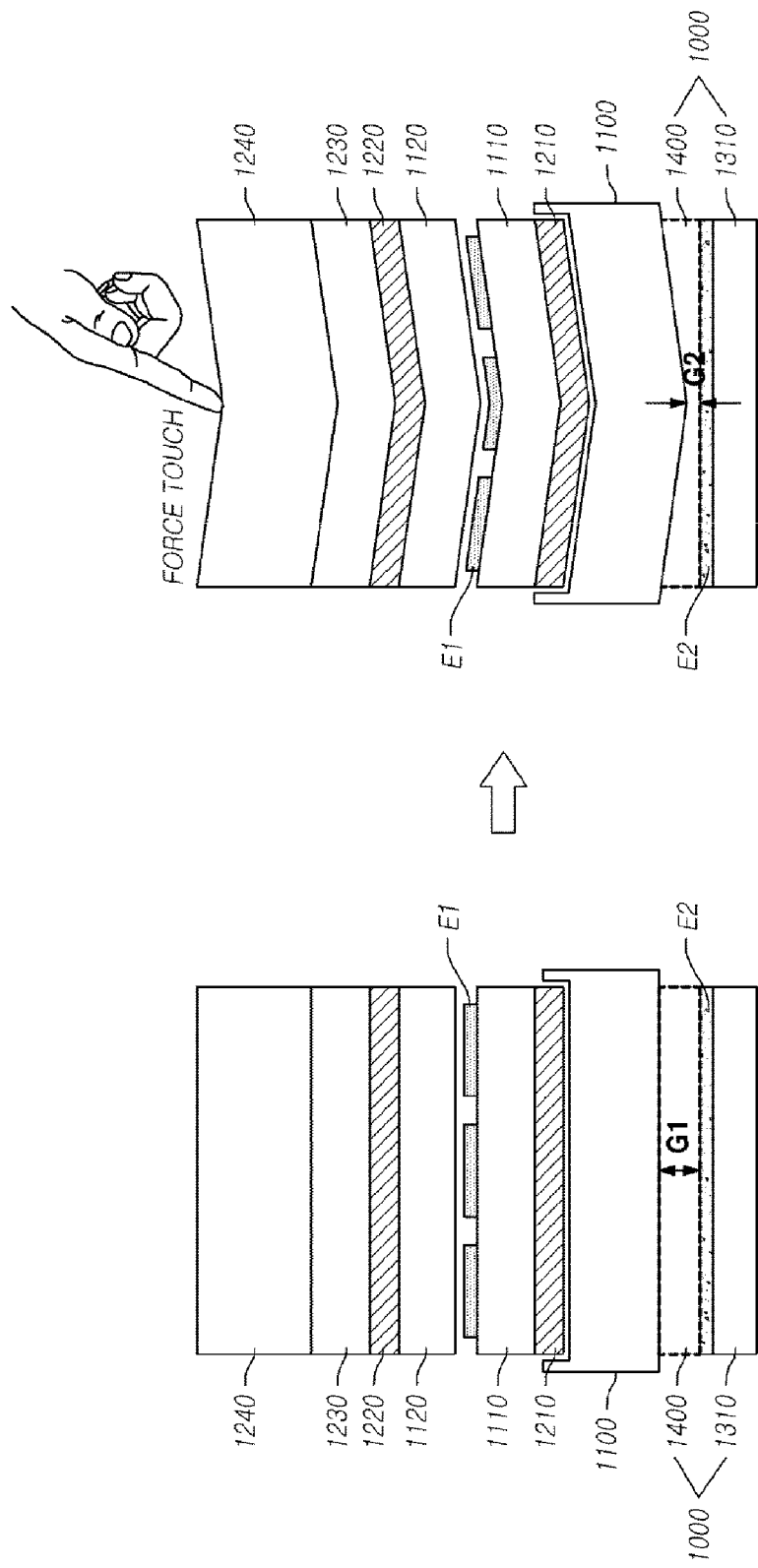

Referring to FIG. 14, the gap structure unit 1000 may include a base plate 1310 made of a substrate or a film, an elastic sheet 1400 positioned between the upper surface of a second electrode E2, which is positioned on the base plate 1310, and the rear surface of a lower structure 1100, and the like.

The elastic sheet 1400 may be attached, bonded, or coated on the rear surface of the lower structure 1100.

Referring to FIG. 14, when a force touch occurs, the upper cover 1240, the display panel 110, the lower structure 1100, and the like receive a downward force. Accordingly, the touch force of the touch changes the thickness of the elastic sheet, and the size of the G between the upper surface of the second electrode E2 and the rear surface of the lower structure 1100 may change as a result.

Particularly, the gap G before occurrence of the force touch is G1, and the gap G after occurrence of the touch force is G2, which is smaller than G1.

Such a decrease of the gap G from G1 to G2, before and after occurrence of a force touch, changes the second capacitance C2 and enables recognition of the force touch.

The gap structure unit 1000 of FIG. 14 can be made thinner, and does not require modification of existing structures, such as the display panel 110 and the lower structure 1100, making it possible to easily implement a touch system 100 capable of efficient force touch sensing with no significant change in size of the in-cell touch type display device.

Figure 15:
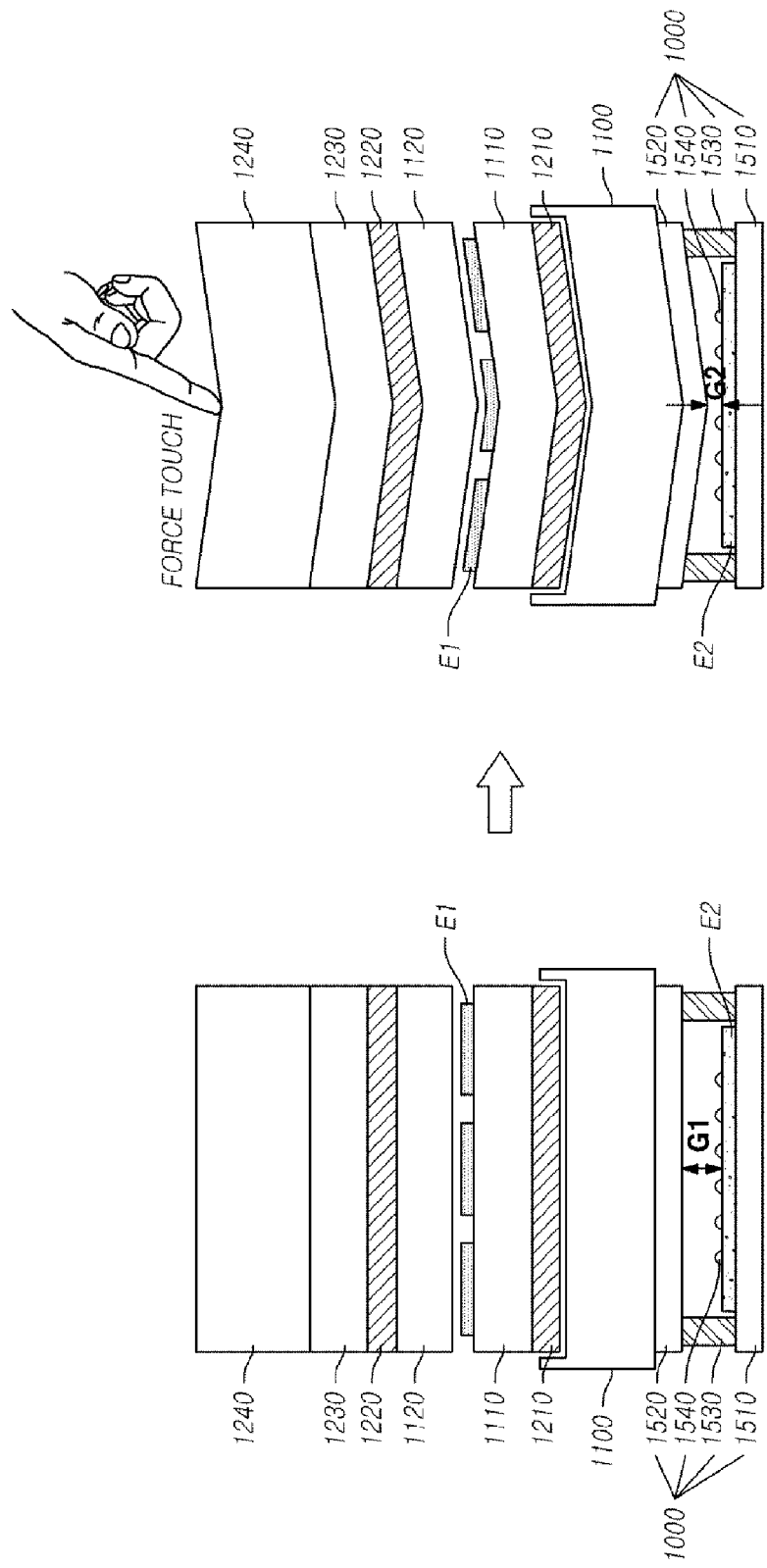

Referring to FIG. 15, the gap structure unit 1000 may include an upper film 1520 positioned on the rear surface of a lower structure 1100, a lower film 1510 facing the upper film 1520, a bonding agent 1530 bonded to the rear surface edge of the upper film 1520 and to the upper surface edge of the lower film 1510, and the like.

Referring to FIG. 15, a second electrode E2 may be positioned in an internal space provided by spacing between the non-edge portion of the rear surface of the upper film 1520 and the non-edge portion of the upper surface of the lower film 1510.

Referring to FIG. 15, a spacer 1540 may exist on the upper surface of the second electrode E2. When a force touch occurs, the upper cover 1240, the display panel 110, the lower structure 1100, and the like receive a downward force. Accordingly, the size of the G between the upper surface of the second electrode E2 and the rear surface of the upper film 1520 may change according to the touch force of the touch.

Particularly, the gap G before occurrence of the force touch is G1, and the gap G after occurrence of the touch force is G2, which is smaller than G1. Such a decrease of the gap G from G1 to G2, before and after occurrence of a force touch, changes the second capacitance C2 and enables recognition of the force touch.

The spacer 1540 may be made of resilient material so that it can be deformed when pressed down by the upper film 1520 and can recover its shape when the upper film 1520 no longer exerts force on the spacer 1540. The spacer 1540 prevents the upper film 1520 (or the lower structure 1100) from coming into direct contact with the second electrode E2 and also prevents the second electrode E2 from deforming even when external force is applied through the upper cover 1240. The spacer 1540 may be made of conductive or non-conductive material.

The gap structure unit 1000 of FIG. 15 is implemented in a module type such that, without modifying existing structures such as the display panel 110, the lower structure 1100, and the like, the module-type gap structure unit 1000 can be attached beneath the lower structure 1100. This is advantageous in that the gap structure unit 1000 can be included in the in-cell touch type display device.

Figure 16:
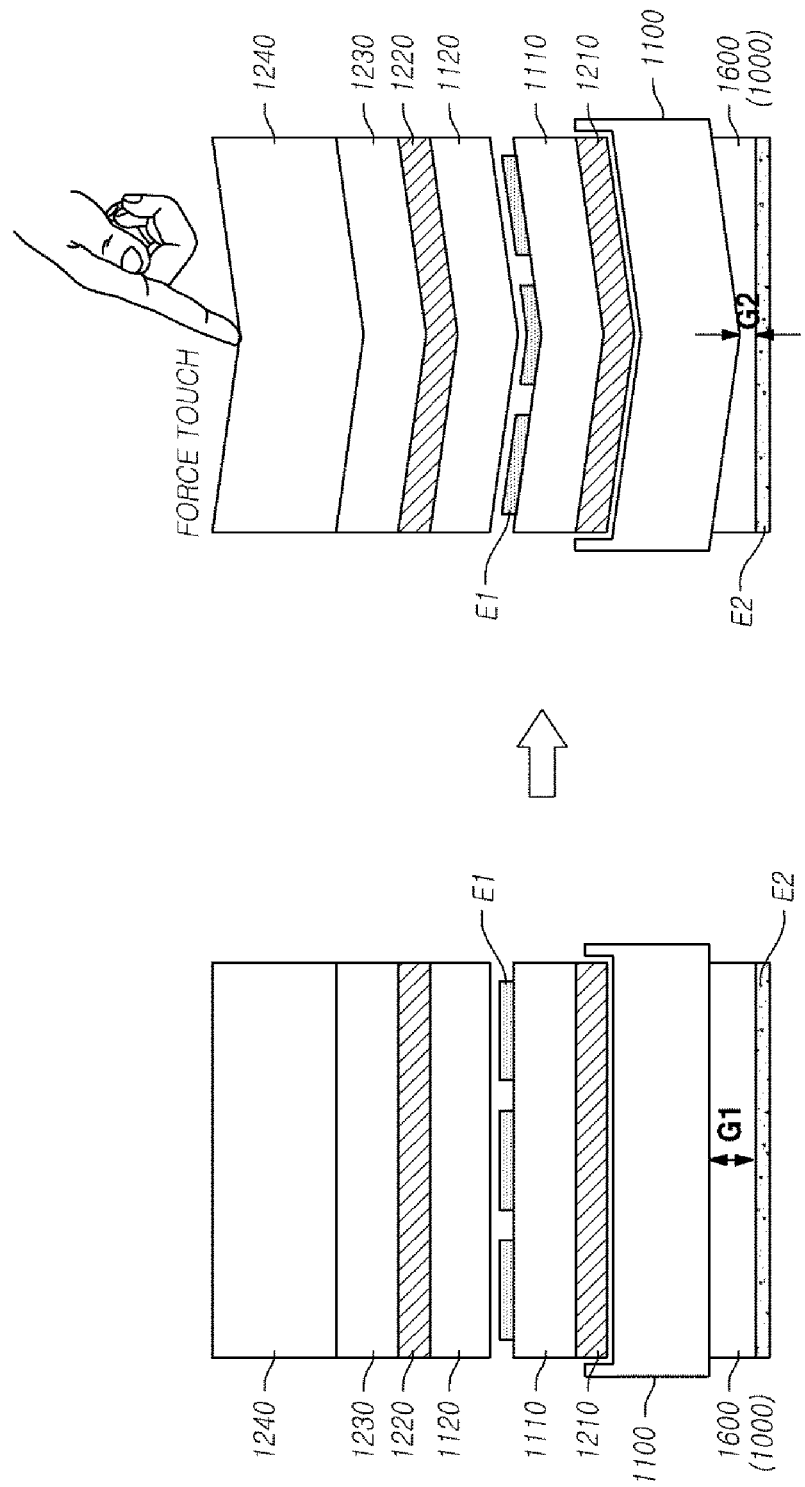

Referring to FIG. 16, the gap structure unit 1000 may include an elastic film 1600 positioned between the upper surface of a second electrode E2 and the rear surface of a lower structure 1100, and the like. When a force touch occurs, the upper cover 1240, the display panel 110, the lower structure 1100, and the like receive a downward force. Accordingly, the touch force of the touch changes the thickness of the elastic film, and the size of the G between the upper surface of the second electrode E2 and the rear surface of the lower structure 1100 may change as a result.

Particularly, the gap G before occurrence of the force touch is G1, and the gap G after occurrence of the touch force is G2, which is smaller than G1. Such a decrease of the gap G from G1 to G2, before and after occurrence of a force touch, changes the second capacitance C2 and enables recognition of the force touch.

The gap structure unit 1000 of FIG. 16 has a small thickness and therefore can implement a touch system 100 capable of force touch sensing without increasing the size of the in-cell touch type display device.

Figure 17:
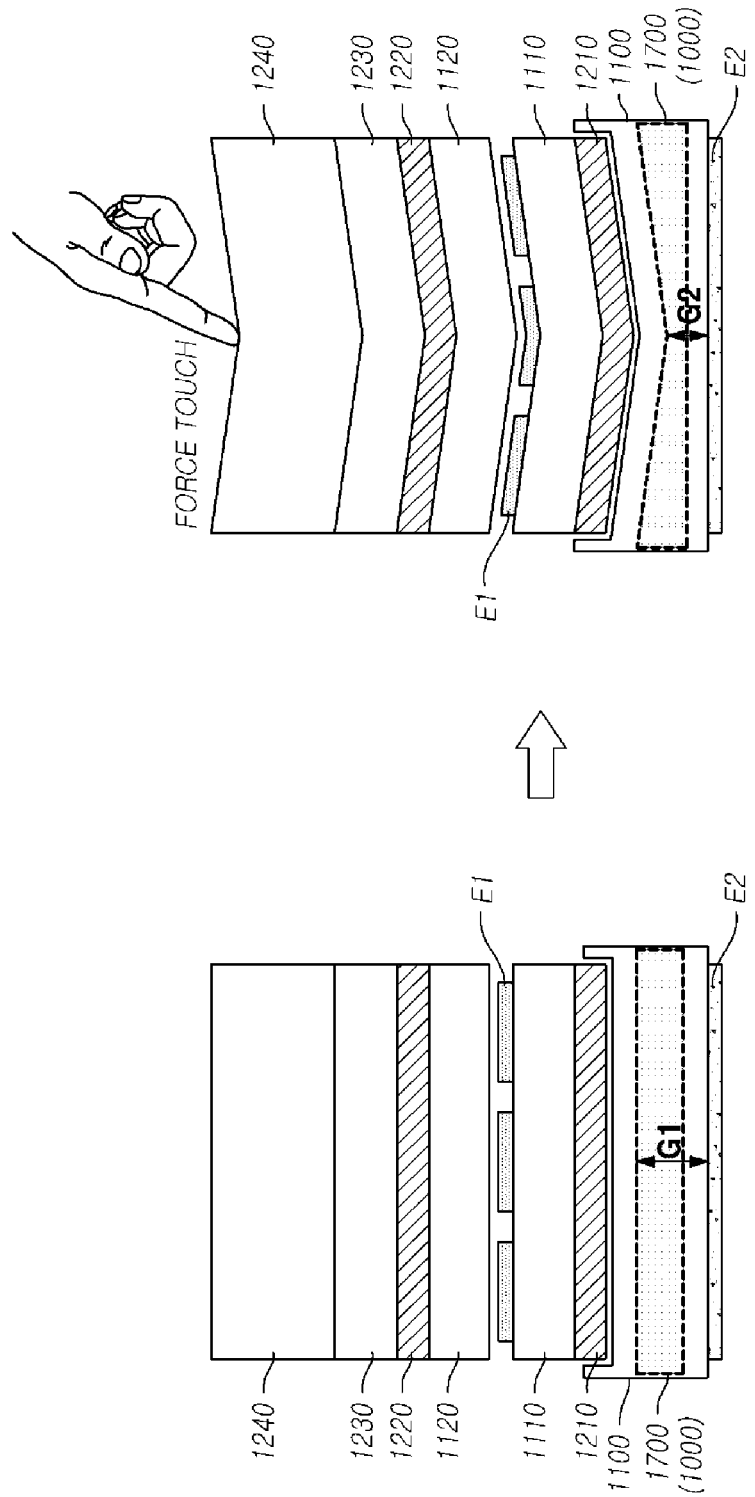

Referring to FIG. 17, the gap structure unit 1000 may include an inner pattern 1700 embedded in a lower structure 1100. When a force touch occurs, the upper cover 1240, the display panel 110, the lower structure 1100, and the like receive a downward force. Accordingly, the inner pattern 1700, which is inside the lower structure 1100, also receives the force, and the touch force of the touch may change size of the gap G between the upper surface of the second electrode E2, which is positioned beneath the lower structure 1100, and the inner pattern.

The inner pattern 1700 may be made of resilient material so that it can be deformed when pressed down and can recover its shape when external force is no longer applied. The internal pattern 1700 prevents the external force from being transferred to the second electrode E2 and thereby prevents the second electrode E2 from being deformed by the external force. The internal pattern 1700 may be made of conductive or non-conductive material.

Particularly, the gap G before occurrence of the force touch in the internal pattern 1700 is G1, and the gap in the internal pattern 1700 after occurrence of the touch force is G2, which is smaller than G1. Such a decrease of the gap G from G1 to G2, before and after occurrence of a force touch, changes the second capacitance C2 and enables recognition of the force touch.

The gap structure unit 1000 of FIG. 17 is included inside the lower structure 1100 and therefore can implement a touch system 100 capable of force touch sensing without changing the size of the in-cell touch type display device.

Figure 18:
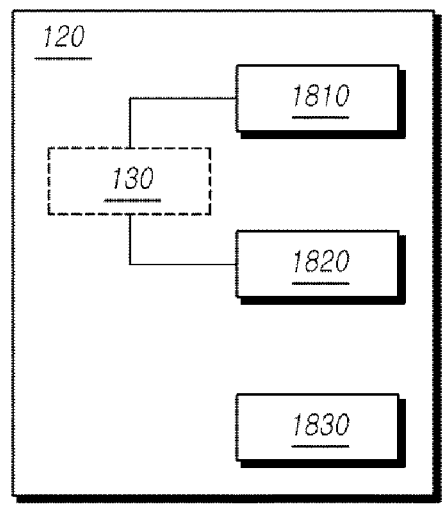
FIG. 18 is a block diagram of a touch circuit according to one embodiment.

FIG. 18 is a block diagram of a touch circuit 120 according to the present embodiments. Referring to FIG. 18, a touch circuit 120 according to the present embodiments may include a first electrode driving unit 1810 configured to output a first electrode driving signal DS1, which is to be sequentially applied to each of multiple first electrodes E1 during touch driving, a second electrode driving unit 1820 configured to output a second electrode driving signal DS2, which is to be applied to a second electrode E2 during touch driving, and the like.

Use of the touch circuit 120 according to the present embodiments enables performing of first electrode driving and second electrode driving in the same touch driving process; as a result, sensing regarding whether a touch occurs or not and regarding the touch coordinate and touch force sensing can be performed within a shorter period of time.

The second electrode driving signal DS2 and the first electrode driving signal DS1 may have the same phase. That is, the second electrode driving signal DS2 and the first electrode driving signal DS1 may have an equiphase relationship.

The second electrode driving signal DS2 and the first electrode driving signal DS1 may have a phase difference of 180 degrees. That is, the second electrode driving signal DS2 and the first electrode driving signal DS1 may have a reverse-phase relationship.

The second electrode driving signal DS2 may have a signal amplitude larger than that of the first electrode driving signal DS1.

On the other hand, referring to FIG. 18, the touch circuit 120 according to the present embodiments may further include a sensing unit 1830 configured such that during touch driving, a first electrode driving signal DS1 is successively applied to the multiple first electrodes E1, a second electrode driving signal DS2 is applied to the second electrode E2, and the sensing unit 1830 senses a touch on the basis of signals received from the multiple first electrodes E1, respectively.

The sensing unit 1830 can calculate the coordinate of the touch, on the basis of signals received from the multiple first electrodes E1, respectively, and can sense the amount of charging or voltage, which follows the change in size of the gap G between the multiple first electrodes E1 and the second electrode E2 (G1−>G2), thereby recognizing the touch force of the touch.

The sensing unit 1830 may sense the touch coordinate and the touch force in a self capacitance-based sensing type, among capacitance-based touch sensing types.

Referring to FIG. 18, the touch system 120 according to the present embodiments may further include a second electrode driving signal generation unit 130 configured to generate a second electrode driving signal DS2, which corresponds to the first electrode driving signal DS1.

As described above, the touch circuit 120 includes a second electrode driving signal generation unit 130 such that, through the touch circuit 120, a second electrode driving signal DS2 can be generated easily and efficiently through processing such as generating a first electrode driving signal DS1 and shifting the level regarding the first electrode driving signal DS1 or reversing the phase, for example.

Figure 19:
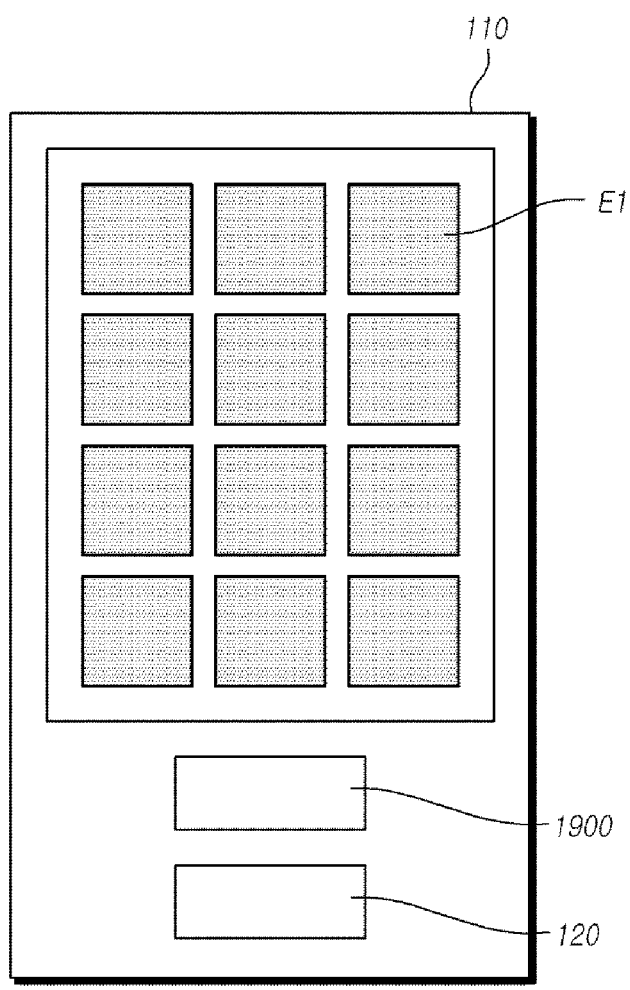
FIG. 19 through FIG. 21 are plan views illustrating in-cell touch type display devices and touch circuits according to embodiments.
Figure 20:
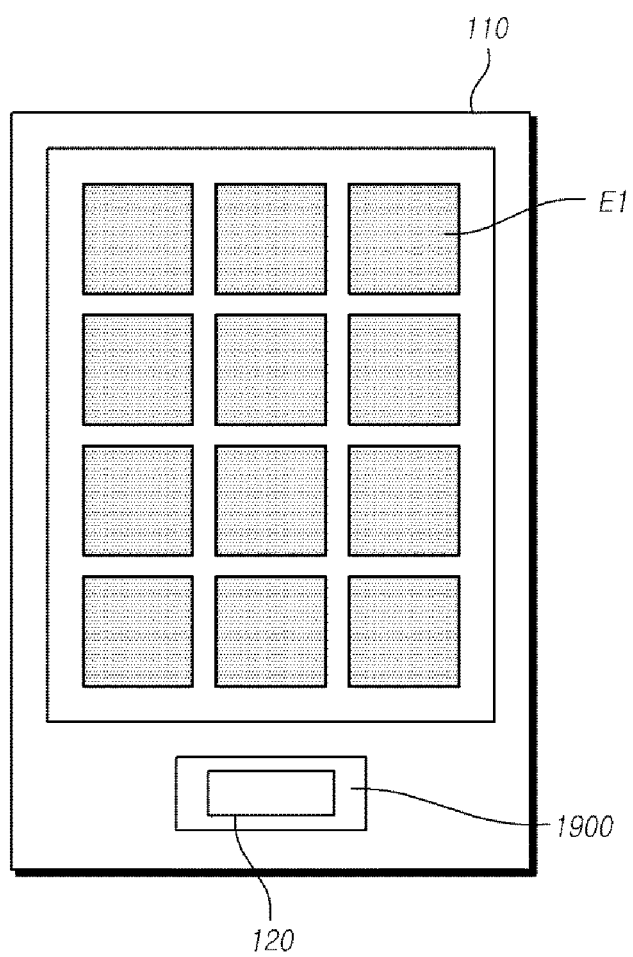
Figure 21:
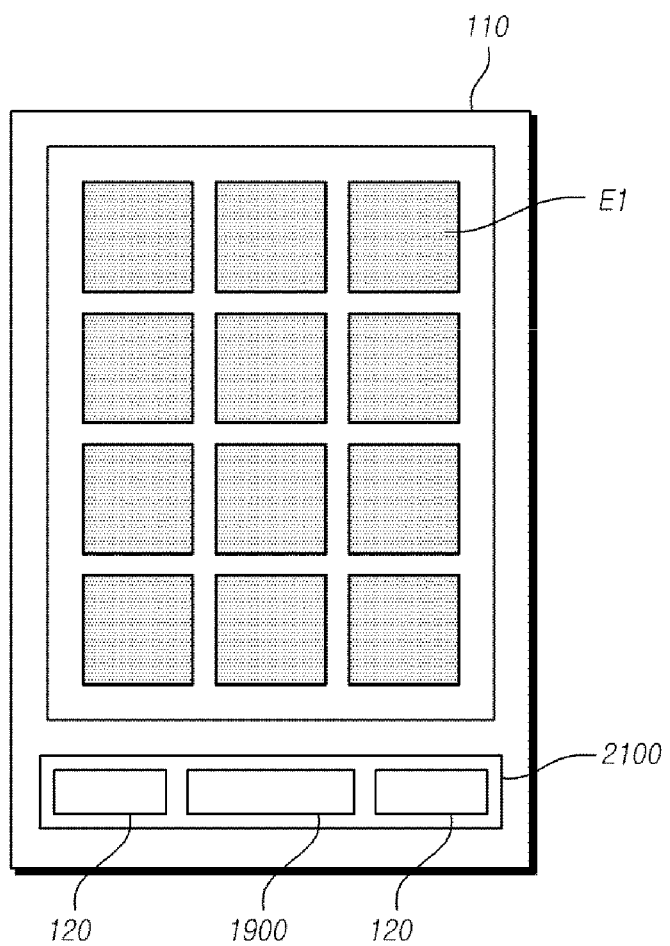

FIG. 19 to FIG. 21 are diagrams illustrating examples of implementation of an in-cell touch type display device and a touch circuit 120 according to the present embodiments. As illustrated in FIG. 19, the touch circuit 120 may be included outside a data driver 1900. As illustrated in FIG. 20, the touch circuit 120 may be included inside the data driver 1900, which is implemented in a chip type. As illustrated in FIG. 21, the touch circuit 120 may be included in a chip-type display driver 2100 together with a data driver 1900.

As described above, various types of touch circuits 120 can be implemented in various manners. Particularly, when the touch circuit 120 is implemented by including the same in a chip-type data driver 1900 or a display driver 2100, the number of chips mounted or connected to the display panel 110 can be reduced.

A display driver 2100, which includes a touch circuit 120 and a data driver 1900, and which is implemented in a chip type, will hereinafter be described briefly.

Figure 22:
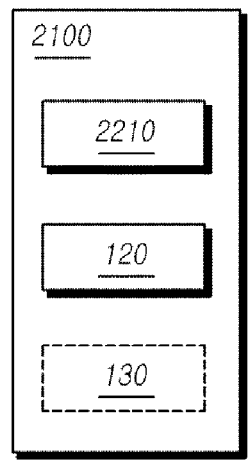
FIG. 22 is a block diagram of a display driver according to one embodiment.
Figure 23:
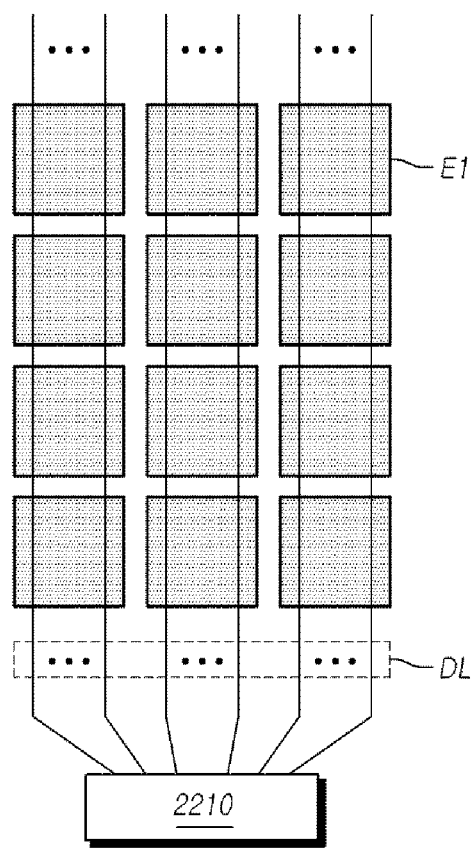
FIG. 23 is a diagram illustrating using data lines to connect a data driving circuit in a display driver with first electrodes, according to one embodiment.
Figure 24:
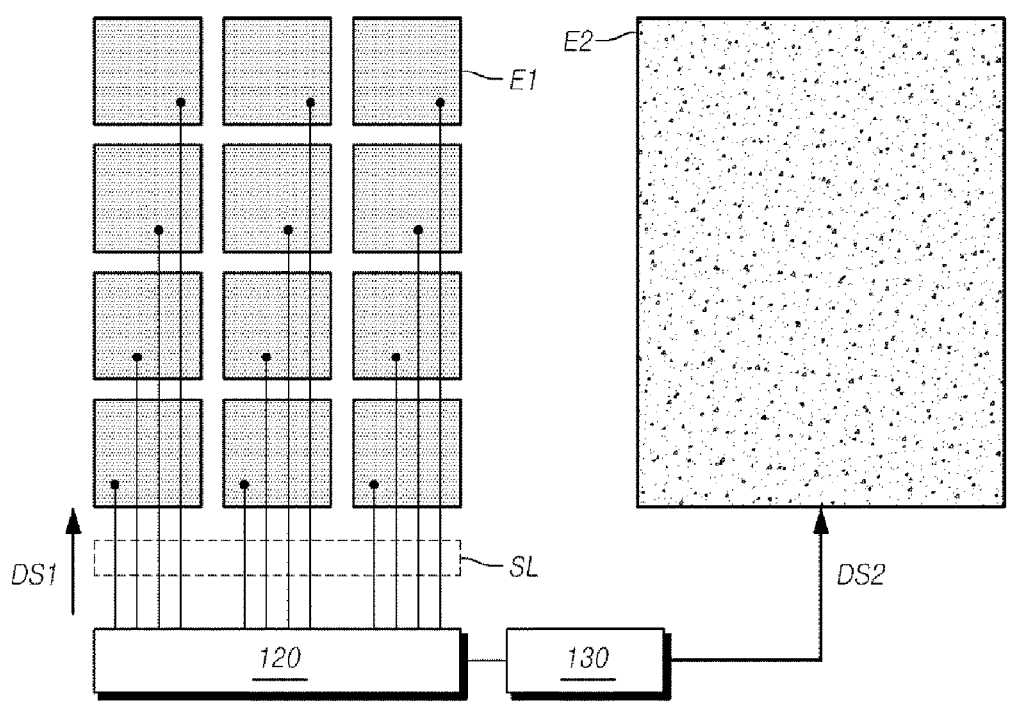
FIG. 24 is a conceptual diagram illustrating applying voltage signals to electrodes, according to one embodiment.

FIG. 22 is a block diagram of a display driver 2100 according to the present embodiments. FIG. 23 is a diagram illustrating data driving by a data driving circuit 2210 included in a display driver 2100 according to the present embodiments. FIG. 24 is a diagram illustrating touch driving (first electrode driving and second electrode driving) by a touch circuit 120 included in a display driver 2100 according to the present embodiments.

Referring to FIG. 22, the display driver 2100 according to the present embodiments includes a data driving circuit 2210 configured to output a data voltage to multiple data lines during display driving, a touch circuit 120 configured to output a first electrode driving signal DS1, which is to be successively applied to multiple first electrodes E1 arranged on the display panel 110, during touch driving and configured to output a second electrode driving signal DS2, which is to be applied to a second electrode E2 arranged outside the display panel 110, and the like.

Use of a one chip-type display driver 2100, which includes a data driving circuit 2210 and a touch circuit 120 as described above, can reduce the number of chips mounted or connected to the display panel 110.

Referring to FIG. 22, the display driver 2100 according to the present embodiments may further include a second electrode driving signal generation unit 130 configured to generate a second electrode driving signal DS2, which corresponds to the first electrode driving signal DS1.

As described above, the display driver 2100 includes a second electrode driving signal generation unit 130 such that a second electrode driving signal DS2 can be generated easily and efficiently through processing such as generating a first electrode driving signal DS1 and shifting the level regarding the first electrode driving signal DS1 or reversing the phase, for example.

Referring to FIG. 23, the data driving circuit 2210 may supply a data voltage for image display, to multiple data lines DL arranged on the display panel 110 during display driving in a display driving mode period.

The data driving circuit 2210 corresponds to a data driver 1900.

Referring to FIG. 24, signals lines SL may be arranged on the display panel 110 so as to connect the multiple first electrodes E1 to the touch circuit 120, respectively.

The touch circuit 120 successively supplies a first electrode driving signal DS1 to the multiple first electrodes E1 during touch driving in a touch mode period.

To this end, one or more multiplexers (not illustrated) may be provided inside or outside the display driver 2100 so as to electrically connect at least one of the multiple signal lines SL to the touch circuit 120.

Accordingly, at a specific point of time, a first electrode driving signal DS1 is applied to at least one first electrode E1.

While a first electrode driving signal DS1 is successively applied to the multiple first electrodes E1, and a second electrode driving signal DS2 may be applied to the second electrode E2.

Referring to FIG. 24, the second electrode driving signal generation unit 130 may generate a second electrode driving signal DS2 on the basis of the first electrode driving signal DS1 generated and output from the touch circuit 120.

The two kinds of signals applied during touch driving, i.e. the second electrode driving signal DS2 and the first electrode driving signal DS1, may have the same phase. That is, the second electrode driving signal DS2 and the first electrode driving signal DS1 may have an equiphase relationship.

The second electrode driving signal DS2 and the first electrode driving signal DS1 may have a phase difference of 180 degrees. That is, the second electrode driving signal DS2 and the first electrode driving signal DS1 may have a reverse-phase relationship.

The second electrode driving signal DS2 may have a signal amplitude larger than that of the first electrode driving signal DS1.

The touch circuit 120 included in the display driver 2100 may be configured such that during touch driving, a first electrode driving signal DS1 is successively applied to the multiple first electrodes E1, a second electrode driving signal DS2 is applied to the second electrode E2, and the touch circuit 120 senses a touch on the basis of signals received from the multiple first electrodes E1, respectively.

The touch circuit 120 can calculate the coordinate of the touch, on the basis of signals received from the multiple first electrodes E1, respectively, and can sense the amount of charging or voltage, which follows the change in size of the gap G between the multiple first electrodes E1 and the second electrode E2, thereby recognizing the touch force of the touch.

Therefore, it is possible to provide a display driver 2100 not only capable of data driving for image display, but also capable of touch coordinate sensing and force sensing through the same.

On the other hand, the multiple first electrodes E1 may be mode-sharing electrodes that can be used as display driving electrodes in a display driving mode.

Therefore, the display driver 2100 may further include a multiplexer (not illustrated) configured to output a common voltage, which is to be applied to the multiple first electrodes E1 during display driving, and configured to output a first electrode driving signal DS1, which is to be successively applied to the multiple first electrodes E1 during touch driving.

A method for driving the in-cell touch type display device according to the present embodiments, which has been described above, will now be described briefly.

Figure 25:
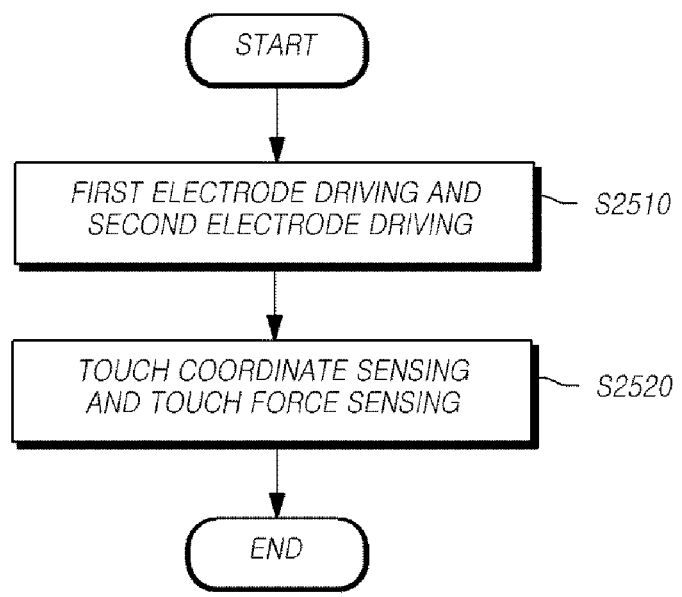
FIG. 25 is a flowchart of a method for driving an in-cell touch type display device, according to one embodiment.

FIG. 25 is a flowchart of a method for driving an in-cell touch type display device according to the present embodiments.

Referring to FIG. 25, the method for driving an in-cell touch type display device according to the present embodiments includes a step (S2510) of successively applying a first electrode driving signal DS1 to multiple first electrodes E1, which are embedded in a display panel 110, and applying a second electrode driving signal DS2 to a second electrode E2, which is positioned outside the display panel 110, during touch driving, a step (S2520) of sensing a touch on the basis of signals received from the multiple first electrodes E1, respectively, and the like.

In the above-mentioned step S2520, the coordinate of the touch can be calculated on the basis of signals received from the multiple first electrodes E1, respectively, and the amount of charging or voltage, which follows the change in size of the gap G between the multiple first electrodes E1 and the second electrode E2, can be sensed, thereby recognizing the touch force of the touch.

The above-mentioned method for driving an in-cell touch type display device according to the present embodiments, when employed, can proceed with first electrode driving and second electrode driving in the same touch driving process and therefore can perform sensing related to whether a touch has occurred or not and the coordinate of the touch and touch force sensing within a shorter period of time compared with a case in which the first electrode driving and the second electrode driving proceed separately through different driving processes.

The in-cell touch type display device 100 according to the present embodiments, described above, may include multiple first electrodes E1 embedded in a display panel 110, a second electrode E2 positioned outside (for example, beneath) the display panel 110, a touch force sensing circuit configured to drive the multiple first electrodes E1, which are embedded in the display panel 110, and the second electrode E2, which is positioned outside the display panel 110, together during one touch driving period and configured to sense a touch force applied to the display panel 110, and the like.

In this regard, the touch force sensing circuit may be a touch circuit 120 or a display driver 2100, for example.

The present embodiments, described above, can provide an in-cell touch type display device, a touch circuit 120, a display driver 2100, and an in-cell touch type display device driving method, which can not only sense the coordinate (position) of a touch generated by the user, but also sense the touch force, with which the user presses the screen during the touch, in order to provide various functions in various types.

The present embodiments can provide an in-cell touch type display device, a touch circuit 120, a display driver 2100, and an in-cell touch type display device driving method, which can sense a touch force, with which the user presses the screen during a touch, using an existing touch structure, without any separate pressure sensor or the like.

The present embodiments can provide an in-cell touch type display device, a touch circuit 120, a display driver 2100, and an in-cell touch type display device driving method, which enable simultaneous proceeding of driving for sensing a touch coordinate and driving for sensing a touch force, during a touch driving process.

The present embodiments can provide an in-cell touch type display device, a touch circuit 120, a display driver 2100, and an in-cell touch type display device driving method, which can recognize the position of occurrence of a touch force, i.e. a force with which the user presses the screen, through simultaneous proceeding of first electrode driving and second electrode driving during touch driving.

The present embodiments can provide an in-cell touch type display device, a touch circuit 120, a display driver 2100, and an in-cell touch type display device driving method, which can accurately distinguish between a soft touch, i.e. the force with which the user's touch presses the screen does not exist or is equal to or less than a predetermined level, and a force touch, i.e. the force with which the user's touch presses the screen exists or exceeds the predetermined level.

The present embodiments can provide an in-cell touch type display device, a touch circuit 120, a display driver 2100, and an in-cell touch type display driving method, which enable sensing of a touch force by simultaneously using first electrodes E1, which are provided to sense a touch coordinate, together with a second electrode FS.

The above description and the accompanying drawings provide an example of the technical idea of the present invention for illustrative purposes only. Those having ordinary knowledge in the technical field, to which the present invention pertains, will appreciate that various modifications and changes in form, such as combination, separation, substitution, and change of a configuration, are possible without departing from the essential features of the present invention. Therefore, the embodiments disclosed in the present invention are intended to illustrate the scope of the technical idea of the present invention, and the scope of the present invention is not limited by the embodiment. The scope of the present invention shall be construed on the basis of the accompanying claims in such a manner that all of the technical ideas included within the scope equivalent to the claims belong to the present invention.

What is claimed is:

1. An in-cell touch type display device comprising:
    a plurality of first electrodes embedded in a display panel;
    at least one second electrode outside the display panel and capacitively coupled to each of the first electrodes; and
    a touch circuit coupled to the first electrodes and the at least one second electrode, the touch circuit configured to:
        apply a first voltage signal to each of the first electrodes,
        apply a second voltage signal to the at least one second electrode, and
        detect touch force on the display panel by processing a sensing signal representing a voltage level at each of the first electrodes, responsive to applying the first voltage signal and the second voltage signal,
    wherein the first voltage signal and the second voltage signals have different voltage levels.

2. The in-cell touch type display device of claim 1, wherein the first signal and the second signal are applied during a touch driving period within a frame period.

3. The in-cell touch type display device of claim 1, wherein the touch circuit is further configured to determine a coordinate of a touch by processing sensing signals from the first electrodes.

4. The in-cell touch type display device of claim 1, wherein the sensing signal is of a first voltage level responsive to the display panel receiving a touch of a first touch force and the sensing signal is of a second voltage level responsive to the display panel receiving a touch of a second touch force weaker than the first touch force, the first voltage level higher than the second voltage level.

5. The in-cell touch type display device of claim 1, wherein the touch circuit is configured to determine the touch as a first type of touch responsive to a voltage level of the sensing signal not exceeding a reference voltage and determine the touch as a second type of touch responsive to the voltage level of the sensing signal exceeing the reference voltage.

6. The in-cell touch type display device of claim 1, wherein each of the first electrodes and the at least one second electrode are separated by a distance that changes according to magnitude of touch force on the display panel, the change in the distance causing change in the sensing signal.

7. The in-cell touch type display device of claim 6, wherein air or dielectric material is between the first electrodes and the at least one second electrode.

8. The in-cell touch type display device of claim 1, further comprising a structure configured to mount the display panel, the at least one second electrode placed beneath or inside the structure.

9. The in-cell touch type display device of claim 1, further comprising a gap structure unit configured to set a distance between the first electrodes and the at least one second electrode when the touch force is not applied to the display panel, the distance changing responsive the touch force applied to the display panel.

10. The in-cell touch type display device of claim 9, wherein the gap structure unit comprises:
    a base plate on which the at least one second electrode is mounted; and
    a spacer elastic pattern between edges of an upper surface of the at least one second electrode and edges of a rear surface of a lower structure.

11. The in-cell touch type display device of claim 9, wherein the gap structure unit comprises:
    a base plate on which the at least one second electrode is mounted; and
    an elastic sheet between an upper surface of the at least one second electrode and a rear surface of a lower structure.

12. The in-cell touch type display device of claim 9, wherein the gap structure unit comprises:
    an upper film on a rear surface of a lower structure;
    a lower film facing the upper film; and
    a bonding agent bonding edges of a rear surface of the upper film to an upper surface of the lower film.

13. The in-cell touch type display device of claim 9, wherein the gap structure unit comprises an elastic film between an upper surface of the at least one second electrode and a rear surface of a lower structure.

14. The in-cell touch type display device of claim 9, wherein the gap structure unit comprises an inner pattern embedded in a lower structure.

15. The in-cell touch type display device of claim 14, wherein the lower structure is a back light unit of the display panel.

16. The in-cell touch type display device of claim 2, wherein the first electrodes are applied with a common voltage during a display driving period of the frame period.

17. The in-cell touch type display device of claim 1, wherein the touch circuit is included inside a data driver for generating signals for operating pixels in the display panel.

18. The in-cell touch type display device of claim 1, wherein the touch circuit comprises:
    a first switch turned on or off to selectively connect each of the first electrodes to a first reference voltage; and
    a second switch turned on or off to selectively connect each of the first electrodes to a second reference voltage lower than the first reference voltage, the first signal changing between the first reference voltage and the second reference voltage.

19. The in-cell touch type display device of claim 18, wherein the touch circuit further comprises:
    a third switch turned on or off to selectively connect the at least one second electrode to a third reference voltage; and
    a fourth switch turned on or off to selectively connect the at least one second electrode to a fourth reference voltage lower than the third reference voltage, the second signal changing between the third reference voltage and the fourth reference voltage.

20. The in-cell touch type display device of claim 1, wherein the touch circuit comprises:

a signal path connected to each of the first electrodes;

a resistor connected to the signal path;

a capacitor having a first node connected to the resistor;

an operational amplifier having an inverted input connected to the resistor and an output connected to a second node of the capacitor;

an analog-to-digital converter configured to receive an output signal from the output of the operational amplifier and convert the output signal to a digital signal; and a processor configured to process the digital signal to detect the touch force.

21. A touch circuit comprising:

a first electrode driving circuit configured to output a first signal to each of a plurality of first electrodes embedded in a display panel;

a second electrode driving circuit configured to output a second signal to at least one second electrode outside the display panel; and a detection circuit configured to detect touch force on the display panel by processing a sensing signal representing a voltage level at each of the first electrodes, responsive to applying the first voltage signal and the second voltage signal, wherein the first signal and the second signal have different voltage levels.

22. The touch circuit of claim 21, wherein the first signal and the second signal are applied during a touch driving period within a frame period.

23. The touch circuit of claim 21, wherein the sensing signal is of a first voltage level responsive to the display panel receiving a touch of a first touch force and the sensing signal is of a second voltage level responsive to the display panel receiving a touch of a second touch force weaker than the first touch force, the first voltage level higher than the second voltage level.

* * * * *